US008961294B2

(12) United States Patent
Kitamura et al.

(10) Patent No.: US 8,961,294 B2
(45) Date of Patent: Feb. 24, 2015

(54) GAMING MACHINE CAPABLE OF IMPROVING AMUSINGNESS

(71) Applicants: Universal Entertainment Corporation, Koto-ku, Tokyo (JP); Aruze Gaming America, Inc., Las Vegas, NV (US)

(72) Inventors: Kenta Kitamura, Tokyo (JP); Tatsuya Teranishi, Tokyo (JP); Akira Osawa, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 20 days.

(21) Appl. No.: 13/769,311

(22) Filed: Feb. 16, 2013

(65) Prior Publication Data

US 2013/0217472 A1 Aug. 22, 2013

(30) Foreign Application Priority Data

Feb. 17, 2012 (JP) ................................ 2012-033084

(51) Int. Cl.

| | |
|---|---|
| ***A63F 9/24*** | (2006.01) |
| ***A63F 13/00*** | (2014.01) |
| ***G07F 17/34*** | (2006.01) |
| ***G07F 17/32*** | (2006.01) |

(52) U.S. Cl.

CPC ............ *G07F 17/34* (2013.01); *G07F 17/3244* (2013.01); *G07F 17/3267* (2013.01)

USPC ................................ 463/21; 463/20; 463/25

(58) Field of Classification Search

CPC ............................ G07F 17/3267; G07F 17/34

USPC ........................................................ 463/21

See application file for complete search history.

(56) References Cited

U.S. PATENT DOCUMENTS

| | | | | |
|---|---|---|---|---|
| 4,097,048 A | | 6/1978 | Poulsen et al. | |
| 4,508,345 A | | 4/1985 | Okada | |
| 5,067,712 A | * | 11/1991 | Georgilas | 463/21 |
| 5,833,538 A | * | 11/1998 | Weiss | 463/21 |
| 6,203,429 B1 | * | 3/2001 | Demar et al. | 463/20 |
| 6,210,275 B1 | * | 4/2001 | Olsen | 463/16 |
| 6,224,842 B1 | * | 5/2001 | Rockenfeller et al. | 423/352 |
| 6,443,837 B1 | * | 9/2002 | Jaffe et al. | 463/16 |
| 6,634,945 B2 | * | 10/2003 | Glavich et al. | 463/25 |
| 6,663,489 B2 | * | 12/2003 | Baerlocher | 463/20 |
| 7,014,560 B2 | * | 3/2006 | Glavich et al. | 463/20 |
| 7,070,501 B2 | * | 7/2006 | Cormack et al. | 463/16 |
| 7,094,148 B2 | * | 8/2006 | Baerlocher et al. | 463/20 |
| 7,278,919 B2 | * | 10/2007 | Souza et al. | 463/25 |
| 7,871,327 B2 | | 1/2011 | Walker et al. | |
| 7,942,733 B2 | | 5/2011 | Sakuma | |

(Continued)

*Primary Examiner* — Steven J Hylinski

(74) *Attorney, Agent, or Firm* — KMF Patent Services, PLLC; Kenneth M. Fagin, Esq.; S. Peter Konzel, Esq.

(57) ABSTRACT

The present invention provides a gaming machine capable of improving amusingness of a game by varying the continuity of the main game. According to the present invention, a normal mode game in the normal mode is started based on an input of the bet information from the bet input device; the mode is entered from the normal mode to the chance mode when an enter condition is satisfied as a result of referring to the predetermined symbol determination table in the normal mode; a free game is started as a chance mode game in the chance mode; and the mode is returned from the chance mode to the normal mode when an end condition is satisfied as a result of referring to the specific symbol determination table in the chance mode.

10 Claims, 33 Drawing Sheets

(56) References Cited

U.S. PATENT DOCUMENTS

| | | | | |
|---|---|---|---|---|
| 8,480,477 | B2 * | 7/2013 | Kadode et al. | 463/20 |
| 8,500,554 | B2 * | 8/2013 | Brandstetter et al. | 463/31 |
| 8,613,651 | B2 * | 12/2013 | Ghaly | 463/17 |
| 2003/0045343 | A1 * | 3/2003 | Luccesi et al. | 463/20 |
| 2003/0064796 | A1 * | 4/2003 | Glavich et al. | 463/25 |
| 2003/0211880 | A1 * | 11/2003 | Locke | 463/20 |
| 2004/0002372 | A1 * | 1/2004 | Rodgers et al. | 463/20 |
| 2004/0053669 | A1 * | 3/2004 | Gerrard et al. | 463/20 |
| 2004/0067791 | A1 * | 4/2004 | Glavich et al. | 463/20 |
| 2008/0139306 | A1 * | 6/2008 | Lutnick et al. | 463/30 |
| 2008/0227528 | A1 * | 9/2008 | Sakuma | 463/20 |
| 2012/0309496 | A1 * | 12/2012 | Thomas et al. | 463/20 |

* cited by examiner

BUTTON LAYOUT

SYMBOL CODE TABLE

SYMBOL CODE DETERMINATION TABLE

| RANDOM NUMBER | SYMBOL CODE |
|---|---|
| 0 ~ ULIMIT0 | 00 |
| LLIMIT01 ~ ULIMIT01 | 01 |
| LLIMIT02 ~ ULIMIT02 | 02 |
| LLIMIT03 ~ ULIMIT03 | 03 |
| LLIMIT04 ~ ULIMIT04 | 04 |
| LLIMIT05 ~ ULIMIT05 | 05 |
| LLIMIT06 ~ ULIMIT06 | 06 |
| LLIMIT07 ~ ULIMIT07 | 07 |
| LLIMIT08 ~ ULIMIT08 | 08 |
| LLIMIT09 ~ ULIMIT09 | 09 |
| LLIMIT10 ~ ULIMIT10 | 10 |

FIG. 11

| RANDOM NUMBER | | | | | | | SYMBOL CODE |
|---|---|---|---|---|---|---|---|
| NORMAL GAME | NORMAL GAME | ••• | FIRST CHANCE GAME | SECOND CHANCE GAME | ••• | EIGHT CHANCE GAME | |
| COL NO.1 | COL NO.2 | ••• | COL NO.1 | COL NO.2 | ••• | COL NO.8 | |
| 0 – XXX | 0 – XXX | ••• | 0 – XXX | 0 – XXX | ••• | 0 – XXX | 00 |
| XXX – XXX | XXX – XXX | ••• | XXX – XXX | XXX – XXX | ••• | XXX – XXX | 01 |
| XXX – XXX | XXX – XXX | ••• | XXX – XXX | XXX – XXX | ••• | XXX – XXX | 02 |
| XXX – XXX | XXX – XXX | ••• | XXX – XXX | XXX – XXX | ••• | XXX – XXX | 03 |
| XXX – XXX | XXX – XXX | ••• | XXX – XXX | XXX – XXX | ••• | XXX – XXX | 04 |
| XXX – XXX | XXX – XXX | ••• | XXX – XXX | XXX – XXX | ••• | XXX – XXX | 05 |
| XXX – XXX | XXX – XXX | ••• | XXX – XXX | XXX – XXX | ••• | XXX – XXX | 06 |
| XXX – XXX | XXX – XXX | ••• | XXX – XXX | XXX – XXX | ••• | XXX – XXX | 07 |
| XXX – XXX | XXX – XXX | ••• | XXX – XXX | XXX – XXX | ••• | XXX – XXX | 08 |
| XXX – XXX | XXX – XXX | ••• | XXX – XXX | XXX – XXX | ••• | XXX – XXX | 09 |
| XXX – XXX | XXX – XXX | ••• | XXX – XXX | XXX – XXX | ••• | XXX – XXX | 10 |

| SYMBOL | PAYOUT | PROBABILITY |
|---|---|---|
| | 120 | 1 / 152,043 |
| | 60 | 1 / 21,481 |
| | 30 | 1 / 537 |
| | 90 | 1 / 20,041 |
| | 45 | 1 / 4,163 |
| | 15 | 1 / 172 |
| | 60 | 1 / 18,415 |
| | 30 | 1 / 2,185 |
| | 12 | 1 / 101 |
| | 15 | 1 / 146 |
| | 6 | 1 / 96 |
| | 3 | 1 / 8 |
| | 60 | 1 / 1,560,048,480 |
| | 30 | 1 / 4,369,884 |
| | 15 | 1 / 31,144 |
| | 6 | 1 / 454 |
| | 3 | 1 / 14 |
| | 1000 | 1 / 10415 |
| | 300 | 1 / 1037 |
| | 200 | 1 / 494 |

FIG. 14

WINNING PROBABILITY BY COMBINATION OF "CHERRY" AND "7"

| ORDER OF CHANCE MODE GAME | PROBABILITY OF "CHERRY" | PROBABILITY OF "7" | PROBABILITY OF CONTINUATION |
|---|---|---|---|
| FIRST GAME | - | 1 / 21.7 | 95.39 % |
| SECOND GAME | 1 / 10.4 | 1 / 18.7 | 85.05 % |
| THIRD GAME | 1 / 6.6 | 1 / 15.1 | 78.27 % |
| FOURTH GAME | 1 / 4.9 | 1 / 12.8 | 71.68 % |
| FIFTH GAME | 1 / 3.8 | 1 / 11.3 | 64.90 % |
| SIXTH GAME | 1 / 3.7 | 1 / 9.5 | 62.12 % |
| SEVENTH GAME | 1 / 2.6 | 1 / 8.7 | 50.35 % |
| EIGHTH GAME | 1 / 1.5 | 1 / 3.1 | 0.00 % |

THE PROBABILITY INCREASES WITH THE PROGRESS OF THE CHANCE MODE.

PROBABILITY OF ACHIEVING THE COMBINATION OF "7" IN THE CHANCE MODE GAME

| ORDER OF CHANCE MODE GAME | 777 | 7777 | 77777 |
|---|---|---|---|
| FIRST GAME | 1/ 32.8 | 1 / 67.2 | 1 / 672.0 |
| SECOND GAME | 1 / 29.1 | 1 / 59.7 | 1 / 597.3 |
| THIRD GAME | 1 / 21.9 | 1 / 44.8 | 1 / 448.0 |
| FOURTH GAME | 1 / 20.4 | 1 / 41.8 | 1 / 418.1 |
| FIFTH GAME | 1 / 19.1 | 1 / 39.2 | 1 / 392.0 |
| SIXTH GAME | 1 / 14.3 | 1 / 29.4 | 1 / 294.0 |
| SEVENTH GAME | 1 / 11.3 | 1 / 23.2 | 1 / 232.3 |
| EIGHTH GAME | 1 / 4.6 | 1 / 9.5 | 1 / 94.5 |

FIG. 23

SYMBOL CODE TABLE

| SYMBOL CODE | FIRST COLUMN | SECOND COLUMN | THIRD COLUMN | FOURTH COLUMN | FIFTH COLUMN |
|---|---|---|---|---|---|
| 00 | 7 | 7 | 7 | 7 | 7 |
| 01 | BAR<br>BAR | BAR<br>BAR<br>BAR | BAR<br>BAR | BAR<br>BAR | BAR<br>BAR |
| 02 | BAR<br>BAR<br>BAR | BAR | BAR<br>BAR<br>BAR | BAR<br>BAR<br>BAR | BAR<br>BAR<br>BAR |
| 03 |  |  |  |  |  |
| 04 | BAR<br>BAR<br>BAR | BAR | BAR<br>BAR<br>BAR | BAR<br>BAR<br>BAR | BAR<br>BAR<br>BAR |
| 05 | BAR | BAR<br>BAR<br>BAR |  | BAR | BAR |
| 06 | BAR | BAR<br>BAR | BAR<br>BAR<br>BAR | BAR | BAR |
| 07 | BAR<br>BAR | BAR<br>BAR | BAR<br>BAR | BAR<br>BAR | BAR<br>BAR |
| 08 | WILD | WILD | WILD | WILD | WILD |
| 09 | BAR<br>BAR | BAR<br>BAR | BAR | BAR<br>BAR | BAR<br>BAR |
| 10 | BAR | BAR<br>BAR<br>BAR | BAR | BAR | BAR |

FIG. 24

PAYOUT TABLE

| SYMBOL | PAYOUT | PROBABILITY |
|---|---|---|
| BAR BAR BAR BAR BAR BAR BAR BAR BAR BAR BAR BAR BAR BAR BAR | 120 | 1/195,570 |
| BAR BAR BAR BAR BAR BAR BAR BAR BAR BAR BAR BAR | 60 | 1/7,057 |
| BAR BAR BAR BAR BAR BAR BAR BAR BAR | 15 | 1/249 |
| BAR BAR BAR BAR BAR BAR BAR BAR BAR BAR | 90 | 1/3,417 |
| BAR BAR BAR BAR BAR BAR BAR BAR | 45 | 1/609 |
| BAR BAR BAR BAR BAR BAR | 9 | 1/84 |
| BAR BAR BAR BAR BAR | 60 | 1/2,721 |
| BAR BAR BAR BAR | 30 | 1/679 |
| BAR BAR BAR | 6 | 1/66 |
| ANY BAR ANY BAR ANY BAR ANY BAR ANY BAR | 15 | 1/43 |
| ANY BAR ANY BAR ANY BAR ANY BAR | 6 | 1/20 |
| ANY BAR ANY BAR ANY BAR | 3 | 1/5 |
| | 60 | 1/516,042,395 |
| | 30 | 1/1,847,404 |
| | 15 | 1/16,740 |
| | 6 | 1/308 |
| | 3 | 1/12 |
| | 240 | 1/128,812 |
| | 120 | 1/40,350 |
| | 60 | 1/9,678 |
| WILD WILD WILD WILD WILD | 2500 | 1/206,416,558 |
| WILD WILD WILD WILD | 1200 | 1/3,127,524 |
| WILD WILD WILD | 600 | 1/48,751 |

380A

381A

388A

FIG. 26

| NUMBER OF "WILD" SYMBOLS IN WHICH THE WINNING COMBINATION IS ACHIEVED IN THE PAY LINE | PAYOUT AMOUNT |
|---|---|
| ONE "WILD" SYMBOL | CONSTANT PAYOUT AMOUNT CORRESPONDING TO THE WINNING COMBINATION |
| TWO "WILD" SYMBOLS | TWICE OF THE CONSTANT PAYOUT AMOUNT |
| THREE "WILD" SYMBOLS | FOUR TIMES OF THE CONSTANT PAYOUT AMOUNT |
| FOUR "WILD" SYMBOLS | FIVE TIMES OF THE CONSTANT PAYOUT AMOUNT |
| FIVE "WILD" SYMBOLS | NO MULTIPLICATION OF MULTIPLYING FACTOR, PROVIDED THAT THE PAYOUT AMOUNT IS THE MAXIMUM |

PAYOUT OF COMBINATION OF TWO "CHERRY" SYMBOLS: 6

MULTIPLYING FACTOR TO TWO "CHERRY" SYMBOLS: 2

⇨ ACTUAL PAYOUT: 12

FIG. 28

PROBABILITY OF ACHIEVEMENT OF "WILD" SYMBOL-RELATED COMBINATION IN THE CHANCE MODE

| ORDER OF THE CHANCE MODE GAME | THREE "WILD" | FOUR "WILD" | FIVE "WILD" | THREE "7" | FOUR "7" | FIVE "7" |
|---|---|---|---|---|---|---|
| FIRST GAME | 1 / 147.9 | 1/3,759.5 | 1/143,093.7 | 1 / 28.6 | 1 / 67.2 | 1 / 1,560.1 |
| SECOND GAME | 1 / 138.6 | 1/3,593.9 | 1/141,792.9 | 1 / 28.5 | 1 / 59.7 | 1 / 1,545.9 |
| THIRD GAME | 1 / 134.6 | 1/3,547.8 | 1/141,436.2 | 1 / 27.7 | 1 / 44.8 | 1 / 1,542.0 |
| FOURTH GAME | 1 / 131.9 | 1/3,515.5 | 1/134,586.7 | 1 / 27.0 | 1 / 41.8 | 1 / 1,467.3 |
| FIFTH GAME | 1 / 130.7 | 1/3,488.0 | 1/127,824.7 | 1 / 26.8 | 1 / 39.2 | 1 / 1,358.3 |
| SIXTH GAME | 1 / 128.3 | 1/3,450.9 | 1/124,590.2 | 1 / 26.3 | 1 / 29.4 | 1 / 1,343.7 |
| SEVENTH GAME | 1 / 125.9 | 1/3,449.7 | 1/123,242.7 | 1 / 25.8 | 1 / 23.2 | 1 / 1,317.0 |
| EIGHTH GAME | 1 / 53.7 | 1/627.5 | 1/11,546.9 | 1 / 2.8 | 1 / 10.2 | 1 / 54.2 |

⇩

PROBABILITY OF WINNING BY THE COMBINATION OF "CHERRY", "WILD" AND "7"

| ORDER OF THE CHANCE MODE GAME | PROBABILITY OF "CHERRY" COMBINATION | PROBABILITY OF "WILD" COMBINATION | PROBABILITY OF "7" COMBINATION | PROBABILITY OF CONTINUATION |
|---|---|---|---|---|
| FIRST GAME | - | 1 / 142.2 | 1 / 24.7 | 95.24 % |
| SECOND GAME | 1 / 13.9 | 1 / 133.3 | 1 / 24.7 | 88.01 % |
| THIRD GAME | 1 / 10.3 | 1 / 129.5 | 1 / 23.9 | 85.39 % |
| FOURTH GAME | 1 / 5.9 | 1 / 127.1 | 1 / 23.6 | 77.99 % |
| FIFTH GAME | 1 / 4.0 | 1 / 125.9 | 1 / 23.3 | 69.76 % |
| SIXTH GAME | 1 / 2.9 | 1 / 123.6 | 1 / 22.9 | 60.32 % |
| SEVENTH GAME | 1 / 2.2 | 1 / 131.3 | 1 / 22.5 | 49.89 % |
| EIGHTH GAME | 1 / 2.0 | 1 / 49.2 | 1 / 2.1 | - |

FIG. 29

PROBABILITY OF APPEARANCE OF "WILD" SYMBOL

| GAME MODE | FIRST GAME | SECOND GAME | THIRD GAME | FOURTH GAME | FIFTH GAME |
|---|---|---|---|---|---|
| CHANCE MODE | 1 / 2.7 | 1 / 3.2 | 1 / 3.0 | 1 / 8.7 | 1 / 11.7 |
| NORMAL MODE | 1 / 17.1 | 1 / 21.2 | 1 / 23.3 | 1 / 22.4 | 1 / 22.3 |

FIG. 33
CHERRY
CHANCE!!
Up to 8 FREE GAMES
Chance of winning 3 or more 7 increase !
Cherry Chance continues up to 8 games.
1¢

GAMING MACHINE CAPABLE OF IMPROVING AMUSINGNESS

CROSS REFERENCE TO RELATED APPLICATIONS

This application claims priority of Japanese Patent Application No. 2012-033084 filed on Feb. 17, 2012. The contents of this application are incorporated herein by reference in their entirety.

BACKGROUND OF THE INVENTION

1. Field of the Invention

The present invention relates to a gaming machine and, more particularly, to a gaming machine which rearranges symbols in each of unit games and awards a benefit when a winning pattern is established in the rearranged symbols.

2. Description of the Related Art

A slot machine is a gaming machine that rotates reels to rearrange symbols in a display area each time a game player presses a button located on a control panel to start playing a unit game. When a winning pattern is formed in the display area, a benefit (e.g., a payout) is awarded to the player (for example, refer to U.S. Pat. No. 4,097,048).

In consideration of players' diversified preferences, there have been developed a variety of slot machines. For example, the slot machines has been developed which varies in symbol patterns, gaming scenarios, side effects (sound effects, effects using images, and effects by means of reel spinning). Moreover, the slot machine has been developed which is provided with a bonus game (for example, refer to U.S. Pat. No. 4,508,345). Furthermore, the slot machine also has been developed which permits the enjoyment of a free game under predetermined conditions (for example, refer to U.S. Pat. No. 7,942,733).

Furthermore, there also have been developed the slot machine that allows the player to access television program, web sites, or pay-per-view services (for example, refer to U.S. Pat. No. 7,871,327).

SUMMARY OF THE INVENTION

The amusingness due to the additional features described above, however, is not the same for every player. While some players fully enjoy the additional features, the other players who cannot fully enjoy such additional features may feel irksome even for the main game, and thus their interest in the game may possibly wane. Thus, the gaming machine has been desired that the player can enjoy without getting bored the main game even if various features are added to the gaming machine.

In light of the above-mentioned issues, the present invention is made, and the purpose thereof is to provide a gaming machine capable of improving amusingness of a game by varying the continuity of the main game.

A feature of the present invention is a gaming machine capable obtaining a game result based on a plurality of rearranged symbols, including:

a symbol display unit for rearranging the plurality of symbols;

a bet input device for accepting a betting operation from a player to output a bet information;

a memory having a predetermined symbol determination table causing a predetermined symbol appear on the symbol display unit in a normal mode with a predetermined probability, and a specific symbol determination table causing a specific symbol appear on the symbol display unit in a chance mode with a specific probability; and a controller for executing processes of:

(1-1) starting a normal mode game in the normal mode based on an input of the bet information from the bet input device;

(1-2) entering the mode from the normal mode to the chance mode when an enter condition is satisfied as a result of referring to the predetermined symbol determination table in the normal mode;

(1-3) starting a free game as a chance mode game in the chance mode; and (1-4) returning the mode from the chance mode to the normal mode when an end condition is satisfied as a result of referring to the specific symbol determination table in the chance mode.

Since a free game is run as a chance mode game in a chance mode, a player can play the game without reducing any credit. Continuous game playing thus does not reduce the credit, thereby making the game enjoyable for a long time.

In addition to the above, a feature of the present invention is to be further provided with a video display unit for displaying an image, wherein the process (1-2) includes the process of (1-2-1) displaying an enter image on the video display unit indicating that the mode enters into the chance mode when the enter condition is satisfied.

It is possible to explicitly demonstrate to the player that the mode enters into the chance mode.

Furthermore, in addition to the above, a feature of the present invention is to be further provided with a game start input device for accepting a game start operation from a player to output a start command, wherein the process (1-2) includes the process of (1-2-2) making the game start input device ineffective after executing the process (1-2-1) and making the game start input device effective after a predetermined period of time has elapsed; and the process (1-3) includes the process of (1-3-1) starting the scroll of the symbols as the chance mode game based on the start command output from the input device after executing the process (1-2-2), and rearranging a plurality of symbols.

The game starting input device is made ineffective so that it is impossible to play the game further. Therefore, the player can recognize the transition to the chance mode even if he/she overlooks the transition image.

Furthermore, in addition to the above, a feature of the present invention is to include the processes of (1-2-2-1) making a rotation start command from the input device ineffective after executing the process (1-2-1), and displaying the enter image on the video display unit; and (1-2-2-2) erasing the enter image from the video display unit after a predetermined period of time has elapsed, and making the rotation start command from the input device effective.

Both the progress and the effect of the game enable the player to recognize the transition to the chance mode.

Furthermore, in addition to the above, a feature of the present invention is to include the process of (1-3-2) displaying the image showing the progress of the chance mode game on the video display unit as the chance mode game continues.

It is possible to report the continuation of the chance mode to the player, and thus to give feelings of hope and tension.

A feature of the present invention is a gaming machine capable obtaining a game result based on a plurality of rearranged symbols, including:

a symbol display unit for rearranging the plurality of symbols;

a video display unit for displaying an image;

a bet input device for accepting a betting operation from a player to output a bet information;

a game start input device for accepting a game start operation from a player to output a start command;

a memory having a predetermined symbol determination table causing a enter symbol appear on the symbol display unit in a normal mode with a predetermined probability, a first symbol determination table causing an end symbol appear on the symbol display unit in a chance mode with a first probability, and a second symbol determination table causing the end symbol appear on the symbol display unit in the chance mode with a second probability higher than the first probability; and a controller for executing processes of:

(6-1) starting a unit game in the normal mode as a normal mode game based on an input of the bet information from the bet input device in the normal mode with reference to a predetermined symbol determination table;

(6-2) determining a plurality of symbols to be rearranged on the symbol display unit with reference to the predetermined symbol determination table in the normal mode;

(6-3) entering the mode from the normal mode into the chance mode if the plurality of symbols determined in the process (6-2) includes the enter symbol so as to satisfy the enter condition;

(6-4) displaying an enter image on the video display unit indicating that the mode enters into the chance mode when the enter condition is satisfied;

(6-5) making a rotation start command from the input device ineffective when the enter condition is satisfied;

(6-6) executing the process (6-4), and then erasing the enter image from the video display unit after a predetermined period of time has elapsed;

(6-7) executing the process (6-5), and then making the rotation start command from the input device effective after a predetermined period of time has elapsed;

(6-8) executing the processes (6-6) and (6-7), and then determining a plurality of symbols to be rearranged on the symbol display unit with reference to the first symbol determination table, and executing a first unit game in the chance mode as the chance mode game;

(6-9) executing the first unit game, and then returning the mode from the chance mode to the normal mode when the end symbol is included in the plurality of symbols determined in the process (6-8) so as to satisfy the end condition;

(6-10) executing the first unit game, and then determining the plurality of symbols to be rearranged on the symbol display unit with reference to the second symbol determination table in order to execute the second and subsequent unit games in the chance mode as the chance mode games when the end symbol is not included in the plurality of symbols determined in the process (6-8) so as not to satisfy the end condition, and executing the second and subsequent games;

(6-11) executing the second and subsequent unit games, and then returning the mode from the chance mode to the normal mode when the end symbol is included in the plurality of symbols determined in the process (6-10) so as to satisfy the end condition;

(6-12) executing the second and subsequent unit games, and then determining whether or not the number of times of the second and subsequent unit games reaches a predetermined number of times when the end symbol is not included in the plurality of symbols determined in the process (6-10) so as not to satisfy the end condition;

(6-13) returning the process to the process (6-10) when the number of times of the second and subsequent unit games does not reach the predetermined of number of times as a result of the determination in the process (6-12); and (6-14) determining the plurality of symbols to be rearranged on the symbol display unit with reference to the second symbol determination table at least once until the end condition is satisfied when the number of times of the second and subsequent unit games reaches the predetermined number of times as a result of the determination in the process (6-12), and then rearranging the plurality of symbols satisfying the end condition on the symbol display unit to return the mode from the chance mode to the normal mode.

Since a free game is run as a chance mode game in a chance mode, a player can play the game without reducing any credit. Continuous game playing thus does not reduce the credit, thereby making the game enjoyable for a long time.

Furthermore, in addition to the above, a feature of the present invention is that the second probability changes as the number of times of the second and subsequent unit games increases in the second symbol determination table.

The end condition can become easier to be satisfied as the chance mode goes on, so that it is possible to achieve a balance between the benefit provided to the player and the benefit provided to the game hall.

Furthermore, in addition to the above, a feature of the present invention is that the gaming machine according to claim 7, comprising the process of displaying an image showing the progress of the chance mode game on the video display unit as the number of times of the second and subsequent unit games increases.

It is possible to report the continuation of the chance mode to the player, and thus to give feelings of hope and tension.

It is possible to improve amusingness of a game by varying the continuity of the main game.

BRIEF DESCRIPTION OF THE DRAWINGS

FIG. 11 is a diagram showing a field structure of the symbol code determination table in which a plurality of tables is integrated into a single table.

FIG. 14 is a diagram showing the probabilities of winning combinations associated with specific symbols, which is a table showing the increase of the probabilities as the chance mode game continues.

FIG. 23 is a diagram showing another example of the symbol code table according to a second embodiment of the present invention using a "WILD" symbol.

FIG. 24 is a diagram showing an example of payout tables according to the second embodiment of the present invention.

FIG. 26 is a table showing the correspondence between the number of "WILD" symbol and the multiplying factors determined by the "WILD" symbol in the second embodiment of the present invention.

FIG. 28 is a diagram showing the probabilities of winning combinations associated with the "WILD" symbol, which is a diagram showing the increase of the probabilities as the chance mode game continues.

FIG. 29 is a diagram showing the probabilities that the probability of the "WILD" symbol appearance decreases as the unit game continues.

DESCRIPTION OF THE PREFERRED EMBODIMENTS

Figure 1:
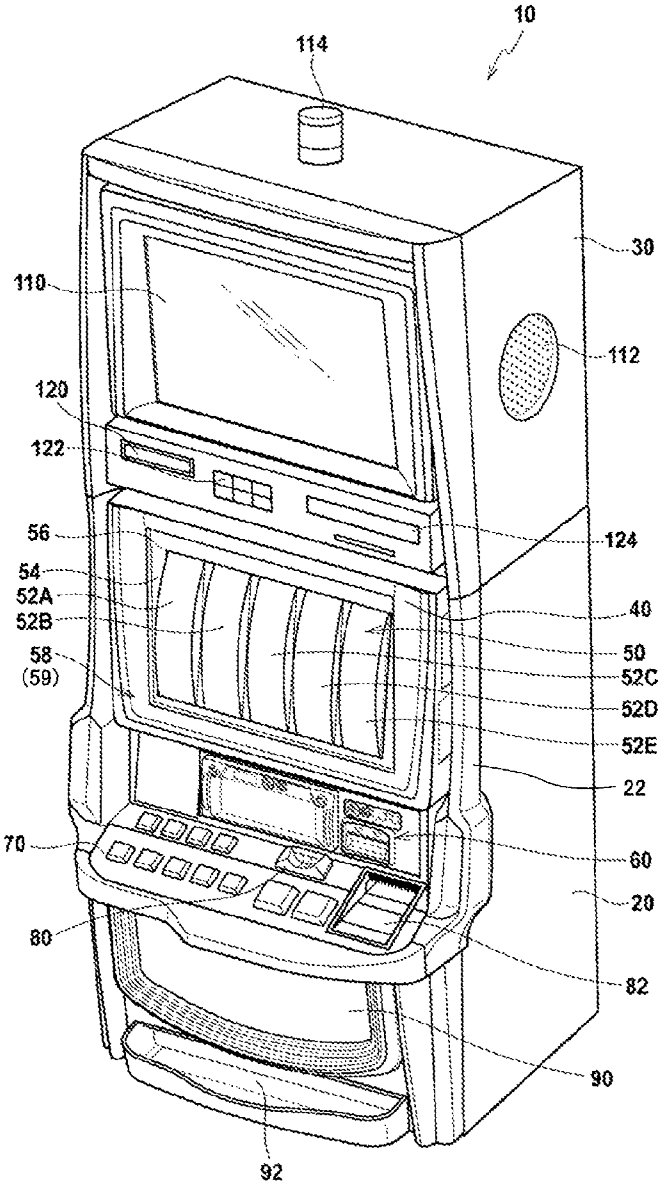
FIG. 1 is a perspective view showing a slot machine according to a first embodiment.

<<<<Summary of a Gaming Machine According to the Embodiments>>>>

A gaming machine according to the present embodiment is the gaming machine capable obtaining a game result based on a plurality of rearranged symbols, including:

a symbol display unit (such as a symbol display unit 40 described below) for rearranging the plurality of symbols;

a bet input device for accepting a betting operation from a player to output a bet information (such as "BET" buttons 74 to 78 described below);

a memory (such as a ROM 224 described below) having a predetermined symbol determination table (such as a symbol code determination table 340) causing a predetermined symbol appear on the symbol display unit in a normal mode with a predetermined probability, and a specific symbol determination table (such as symbol code determination tables 341 to 348) causing a specific symbol appear on the symbol display unit in a chance mode with a specific probability; and a controller for executing processes of:

(1-1) starting a normal mode game in the normal mode based on an input of the bet information from the bet input device (such as the process at step S402 in FIG. 15 described below);

(1-2) entering the mode from the normal mode to the chance mode when an enter condition is satisfied as a result of referring to the predetermined symbol determination table in the normal mode (such as the process at step S404 in FIG. 15 described below);

(1-3) starting a free game as a chance mode game in the chance mode (such as the processes at step S406 in FIG. 15 and FIGS. 31 and 32 described below); and (1-4) returning the mode from the chance mode to the normal mode when an end condition is satisfied as a result of referring to the specific symbol determination table in the chance mode (such as the process at step S3211 in FIG. 32 described below).

Since a free game is run as a chance mode game in a chance mode, a player can play the game without reducing any credit. Continuous game playing thus does not reduce the credit, thereby making the game enjoyable for a long time.

Furthermore, the free game executed as the chance mode game is the game that can be started without inputting bet information from the bet input device. A plurality of symbols to be rearranged in the symbol display unit is determined with reference to the predetermined symbol determination table, and the enter condition is that an enter symbol is included in the determined plurality of symbols. A plurality of symbols to be rearranged in the symbol display unit is determined with reference to the specific symbol determination table, and the end condition is that an end symbol is included in the determined plurality of symbols.

The process (1-1) preferably includes the process (1-1-1) of starting the scroll of the symbols as the normal mode game based on the input of rotation start command from the input device, and stopping the scroll after a predetermined period of time has elapsed so as to rearrange the plurality of symbols on the symbol display unit.

In addition to the above, a feature of the present invention is to be further provided with a video display unit for displaying an image, wherein the process (1-2) includes the process (1-2-1) of displaying an enter image on the video display unit indicating that the mode enters into the chance mode when the enter condition is satisfied (such as the process at step S3115 in FIG. 31 described below).

It is possible to explicitly demonstrate to the player that the mode enters into the chance mode.

Furthermore, in addition to the above, a feature of the present invention is to be further provided with a game start input device (such as a "START" button 79 described below) for accepting a game start operation from a player to output a start command, wherein:

the process (1-2) includes the process of:

(1-2-2) making the game start input device ineffective after executing the process (1-2-1) (such as the process at step S3113 in FIG. 31 described below) and making the game start input device effective (such as the process at step S3123 in FIG. 31 described below) after a predetermined period of time has elapsed (such as the process at step S3117 in FIG. 31 described below); and the process (1-3) includes the process of:

(1-3-1) starting the scroll of the symbols as the chance mode game based on the start command output from the input device after executing the process (1-2-2), and rearranging a plurality of symbols (such as the process at step S3219 in FIG. 32 described below).

The game starting input device is made ineffective so that it is impossible to play the game further. Therefore, the player can recognize the transition to the chance mode even if he/she overlooks the transition image.

Furthermore, in addition to the above, a feature of the present invention is to include the processes of:

(1-2-2-1) making a rotation start command from the input device ineffective after executing the process (1-2-1) (such as the process at step S3113 in FIG. 31 described below), and displaying the enter image on the video display unit (such as the process at step S3115 in FIG. 31 described below); and (1-2-2-2) erasing the enter image from the video display unit (such as the process at step S3119 in FIG. 31 described below) after a predetermined period of time has elapsed (such as the process at step S3117 in FIG. 31 described below), and making the rotation start command from the input device effective (such as the process at step S3123 in FIG. 31 described below).

Both the progress and the effect of the game enable the player to recognize the transition to the chance mode.

Furthermore, in addition to the above, a feature of the present invention is to include the process of (1-3-2) displaying the image showing the progress of the chance mode game on the video display unit as the chance mode game continues.

It is possible to report the continuation of the chance mode to the player, and thus to give feelings of hope and tension.

Figure 31:
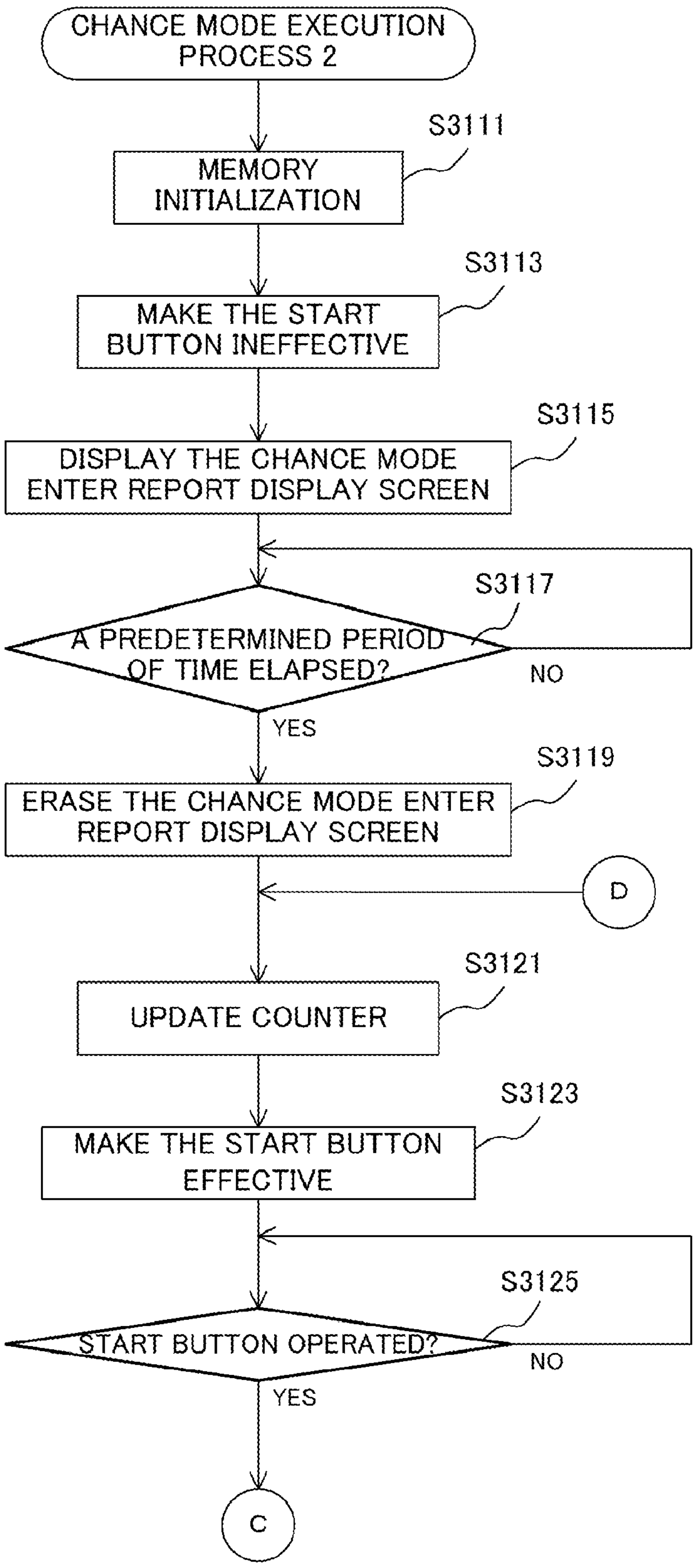
FIG. 31 is a flowchart showing the chance mode game process of the slot machine according to a third embodiment of the present invention.
Figure 32:
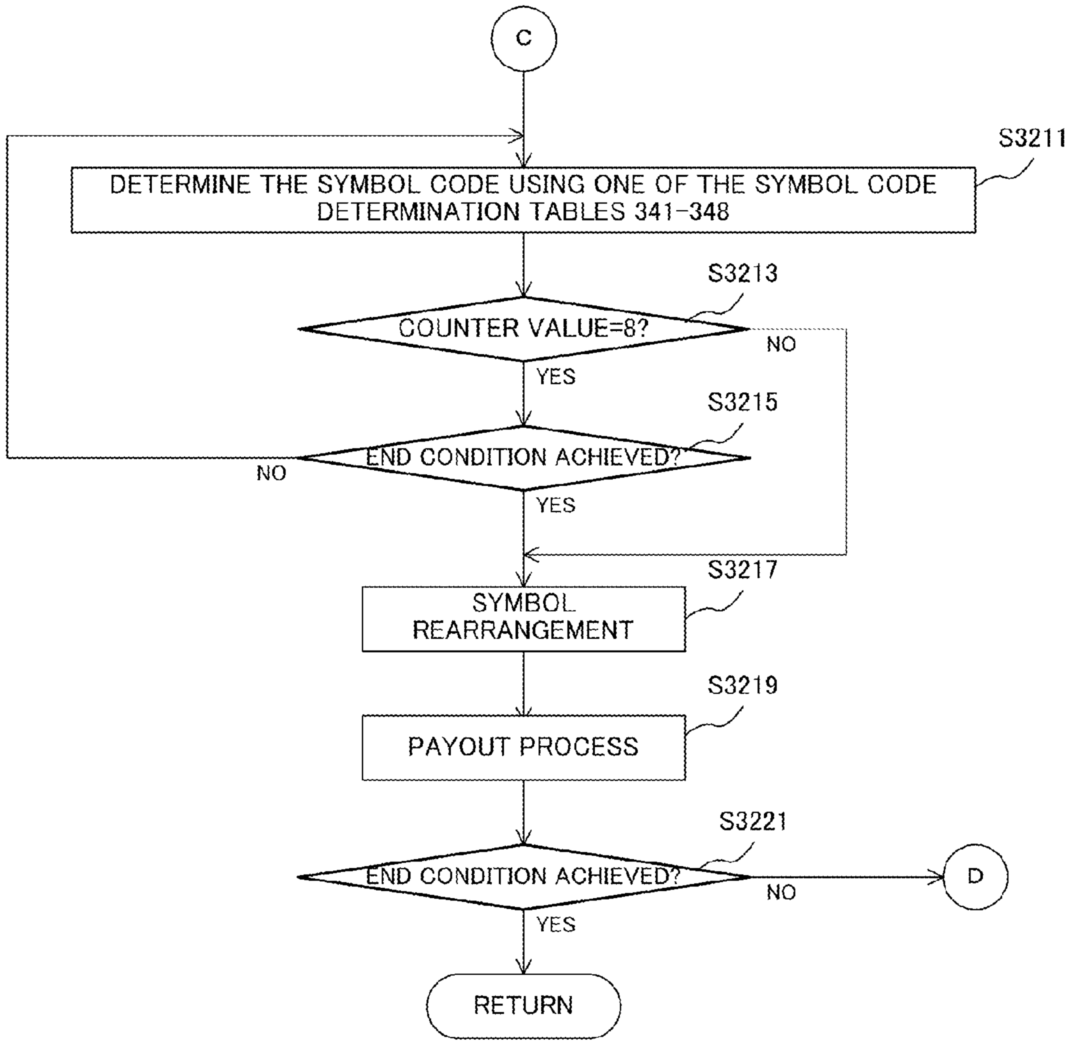
FIG. 32 is a flowchart showing the chance mode game process of the slot machine according to a third embodiment of the present invention.

A feature of the present invention is a gaming machine capable obtaining a game result based on a plurality of rearranged symbols, including:

a symbol display unit for rearranging the plurality of symbols;

a symbol display unit for rearranging the plurality of symbols (such as a symbol display unit 40 described below);

a video display unit for displaying an image (such as a video display unit 110 described below);

a bet input device for accepting a betting operation from a player to output a bet information (such as "BET" buttons 74 to 78 described below);

a game start input device for accepting a game start operation from a player to output a start command (such as a "START" button 79 described below);

a memory (such as a ROM 224 described below) having a predetermined symbol determination table (such as a symbol code determination table 340 described below) causing a enter symbol appear on the symbol display unit in a normal mode with a predetermined probability, a first symbol determination table (such as a symbol code determination table 341 described below) causing an end symbol appear on the symbol display unit in a chance mode with a first probability, and a second symbol determination table (such as symbol code determination tables 342 to 348 described below) causing the end symbol appear on the symbol display unit in the chance mode with a second probability higher than the first probability; and a controller for executing processes of:

(6-1) starting a unit game in the normal mode as a normal mode game based on an input of the bet information from the bet input device in the normal mode with reference to a predetermined symbol determination table (such as the process at step S402 in FIG. 15 described below);

(6-2) determining a plurality of symbols to be rearranged on the symbol display unit with reference to the predetermined symbol determination table in the normal mode (such as the process at step S4162 in FIG. 16 described below);

(6-3) entering the mode from the normal mode into the chance mode if the plurality of symbols determined in the process (6-2) includes the enter symbol so as to satisfy the enter condition (such as the process at step S404 in FIG. 15 described below);

(6-4) displaying an enter image on the video display unit indicating that the mode enters into the chance mode when the enter condition is satisfied (such as the process at step S3115 in FIG. 31 described below);

(6-5) making a rotation start command from the input device ineffective when the enter condition is satisfied (such as the process at step S3113 in FIG. 31 described below);

(6-6) executing the process (6-4), and then erasing the enter image from the video display unit after a predetermined period of time has elapsed (such as the process at step S3117 in FIG. 31 described below);

(6-7) executing the process (6-5), and then making the rotation start command from the input device effective after a predetermined period of time has elapsed (such as the process at step S3123 in FIG. 31 described below);

(6-8) executing the processes (6-6) and (6-7), and then determining a plurality of symbols to be rearranged on the symbol display unit with reference to the first symbol determination table (such as the process at step S3211 in FIG. 32 described below), and executing a first unit game in the chance mode as the chance mode game (such as the process at step S3127 in FIG. 32 described below);

(6-9) executing the first unit game (such as "NO" in the process at step S3213 in FIG. 32 described below), and then returning the mode from the chance mode to the normal mode when the end symbol is included in the plurality of symbols determined in the process (6-8) (such as "YES" in the process at step S3221 in FIG. 32 described below) so as to satisfy the end condition after;

(6-10) executing the first unit game (such as "NO" in the process at step S3213 in FIG. 32 described below), and then determining the plurality of symbols to be rearranged on the symbol display unit with reference to the second symbol determination table (such as the process at step S3211 in FIG. 32 described below) in order to execute the second and subsequent unit games in the chance mode as the chance mode games when the end symbol is not included in the plurality of symbols determined in the process (6-8) so as not to satisfy the end condition (such as "NO" in the process at step S3221 in FIG. 32 described below), and executing the second and subsequent games (such as the process at step S3217 in FIG. 32 described below);

(6-11) executing the second and subsequent unit games (such as "NO" in the process at step S3213 in FIG. 32 described below), and then returning the mode from the chance mode to the normal mode when the end symbol is included in the plurality of symbols determined in the process (6-10) so as to satisfy the end condition (such as "YES" in the process at step S3215 in FIG. 32 and "YES" in the process at step S3221 described below);

(6-12) executing the second and subsequent unit games (such as "NO" in the process at step S3213 in FIG. 32 described below), and then determining whether or not the number of times of the second and subsequent unit games reaches a predetermined number of times (such as the process at step S3213 in FIG. 32 described below) when the end symbol is not included in the plurality of symbols determined in the process (6-10) so as not to satisfy the end condition (such as "NO" in the process at step S3221 in FIG. 32 described below);

(6-13) returning the process to the process (6-10) when the number of times of the second and subsequent unit games does not reach the predetermined of number of times as a result of the determination in the process (6-12) (such as "NO" in the process at step S3213 in FIG. 32 described below); and (6-14) determining the plurality of symbols to be rearranged on the symbol display unit with reference to the second symbol determination table at least once until the end condition is satisfied (such as the process at step S3211 in FIG. 32 described below) when the number of times of the second and subsequent unit games reaches the predetermined number of times as a result of the determination in the process (6-12) (such as "YES" in the process at step S3213 in FIG. 32 described below), and then rearranging the plurality of symbols satisfying the end condition on the symbol display unit (such as the process at step S3121 in FIG. 31 described below) to return the mode from the chance mode to the normal mode (such as "YES" in the process at step S3121 in FIG. 31 described below).

Since a free game is run as a chance mode game in a chance mode, a player can play the game without reducing any credit. Continuous game playing thus does not reduce the credit, thereby making the game enjoyable for a long time.

Furthermore, in addition to the above, a feature of the present invention is that the second probability changes as the number of times of the second and subsequent unit games increases in the second symbol determination table (such as FIG. 14 described below).

The end condition can become easier to be satisfied as the chance mode goes on, so that it is possible to achieve a balance between the benefit provided to the player and the benefit provided to the game hall.

Furthermore, in addition to the above, a feature of the present invention is to include the process of displaying an image showing the progress of the chance mode game on the video display unit as the number of times of the second and subsequent unit games increases.

It is possible to report the continuation of the chance mode to the player, and thus to give feelings of hope and tension.

Embodiments will be described below with reference to the drawings.

<<<<First Embodiment of the Slot Machine>>>>

FIG. 1 is a perspective view showing a slot machine according to a first embodiment.

Gaming medium that can be used in a slot machine 10 includes a coin, a bill, or electrical information corresponding thereto. Also, credits stored in a barcoded ticket or an IC card can be used as the game medium in the slot machine 10. The gaming media is not limited to those mentioned above, but the other types of media can be used as well.

The slot machine 10 shown in FIG. 1 is equipped with a cabinet 20, a top box 30 installed on the cabinet 20, and a main door 22 mounted in front of the cabinet 20.

A symbol display unit 40 including a reel assembly 50 is provided at the main door 22. In the present embodiment, the reel assembly 50 includes five reels 52A to 52E. Each of the reels 52A to 52E has a drum whose outer peripheral surface bears a plurality of types of symbols. The symbol display unit 40 includes a reel cover 54 which is attached in front of the reel assembly 50 and has a display window 56. The reel cover 54 is provided on the outside so that a player can visually identify a part of the reels 52A to 52E. The reel cover 54 is provided on a display panel 58. It is preferable to use a transparent liquid crystal panel as the reel cover 54. The symbol display unit 40 includes a touch panel 59 for detecting touch input by a player.

In a state where the reels 52A to 52E are stopped, three symbols out of the symbols provided on each of the reels 52A to 52E are exposed through the window 56. In this way, a symbol matrix with three rows and five columns are formed in the display window 56. One or more lines are set in advance as pay lines for determining whether or not a winning has achieved. Each time a unit game is executed, the reels 52A to 52E provided with symbols spin in a predetermined speed, and then stops to expose the symbols through the window 56, thereby rearranging the symbols. At least one reel out of the reels 52A to 52E can spin at the speed different from the others.

The rearrangement of the symbols determines the result of the unit game. A benefit depending on the game result is awarded to the player. For example, when a winning combination by the rearranged symbols is achieved along one of the pay lines, a predetermined amount of payout is given to the player. Also, the rearrangement of the symbols determines a game mode of the subsequent unit game. The game modes are a normal mode and a chance mode, which will be described below in detail.

In addition, in the present embodiment, the unit game refers to the game that is executed in the period from the time when the start process of the credit for starting the game is executed to the time when the symbol columns stops so that the symbols are rearranged at the display window 56, followed by the carrying out of the end process such as the payout corresponding to the result of the game. In addition, since the free game does not require a betting operation by the player, it is possible to set the time when the credit process is executed in the slot machine 10 as the start of the game. Furthermore, in the case of the game other than the free game, it is possible to set the time when the betting operation is done by the player as the start of the game. Moreover, the process corresponding to the result of the game determined depending on the rearranged symbols can be set as the end process. For example, it is possible to set the time, for example, when the payout process is executed corresponding to the winning as the end of the game.

A betting amount and a credit amount are displayed in predetermined areas on the display panel 58 of the reel cover 54. The credit amount indicates the number of coins that are owned by the player and deposited inside the slot machine 10. The credit amount indicates the number of coins that are owned by the player and deposited inside the slot machine 10. The payout amount indicates the number of coins to be given to the player when a winning combination is achieved.

The slot machine 10 employs the mechanical reels 52A to 52E in the present embodiment. In addition thereto, video reels or a combination of the mechanical reels and the video reels may be used.

An IC card reader 60 is provided below the symbol display unit 40. The IC card reader 60 receives an IC card. The IC card stores predetermined data such as player identification information and game log data related with the games that the player has previously played. The IC card also can store data equivalent to coins, bills, or credits owned by the player. The IC card reader 60 reads and writes data from and to the inserted IC card. It is preferable that the IC card reader 60 is provided with a liquid crystal display unit for displaying the data read from the IC card.

Figure 2:
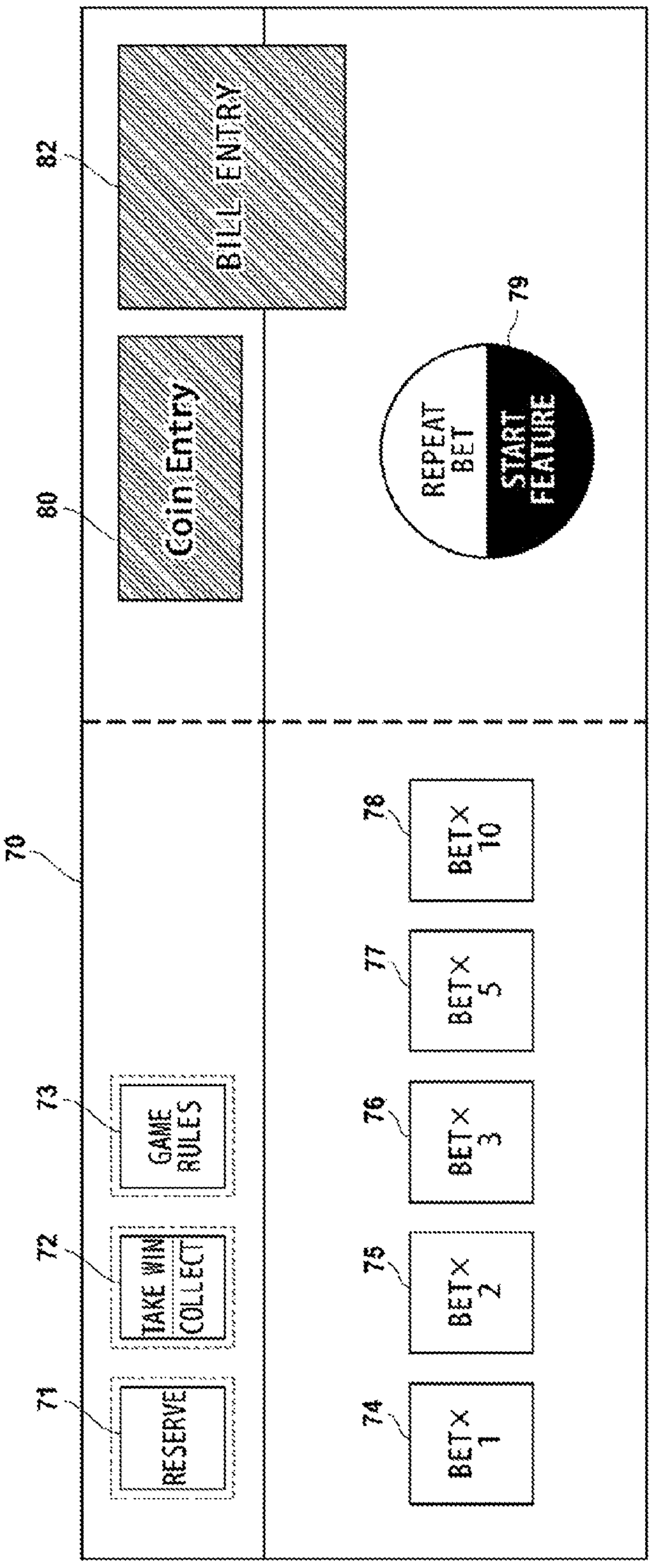
FIG. 2 illustrates a button layout in a control panel of the slot machine shown in FIG. 1.

A control panel 70 is provided in front of a lower end of the IC card reader 60. The control panel 70 is provided with various buttons, a coin insertion unit 80, and a bill insertion unit 81. Specifically, as shown in FIG. 2, a "RESERVE" button 71, a "COLLECT" button 72, and a "GAME RULES" button 73 are provided on an upper left area of the control panel 70. A "1-BET" button 74, a "2-BET" button 75, a "3-BET" button 76, a "5-BET" button 77, and a "10-BET"

button 78 are provided on a lower left area of the control panel 70. Also, a "START" button 79 is provided on the lower center area of the control panel 70. The coin insertion unit 80 is provided in the upper center area of the control panel 70, and the bill insertion unit 82 is provided in the right area of the control panel 70.

The "RESERVE" button 71 is used when the player temporarily leaves the seat or when the player wants to ask a staff of the game facility to exchange money, etc. Also, the "RESERVE" button 71 can be used to store remaining credits in an IC card inserted into the IC card reader 60. The "COLLECT" button 72 is used to instruct the slot machine 10 to pay out credited coins to a coin tray 92. The "GAME RULES" button 73 is used when the player is not acquainted with game rules or operation method. When the "GAME RULES" button 73 is pressed, various types of help information is displayed on a video display unit 110.

The "BET" buttons 74 to 78 are used to set the betting amount. Each time the "1-BET" button 74 is pressed, one credit among the current credits owned by the player is bet for each of the active pay lines. When the "2-BET" button 75 is pressed, the game starts on condition that two credits are bet for each of the active pay lines. When the "3-BET" button 76 is pressed, the game starts on condition that three credits are bet for each of the active pay lines. When the "5-BET" button 77 is pressed, the game starts on condition that five credits are bet for each of the active pay lines. When the "10-BET" button 78 is pressed, the game starts on condition that ten credits are bet for each of the active pay line. The "START" button 79 is used to instruct the initiation of spinning the reels 52A to 52E under the preset betting condition.

When a coin is inserted into the coin insertion unit 80, the inserted coins is guided into a hopper inside the cabinet 20. When a bill is inserted into the bill insertion unit 82, it is determined whether or not the inserted bill is legitimate, and then only a legitimate bill is received into the cabinet 20.

On a lower front face of the main door 22 and below the control panel 30, there are provided a lower glass part 90 and a coin tray 92. The lower glass part 90 bears a character of the slot machine 10 or the like drawn thereon. Coins are paid out on the coin tray 92 from the cabinet 20.

As shown in FIG. 1, a video display unit 110 having a liquid crystal panel is provided at the front surface of the top box 30. The video display unit 110 provides video effect for enhancing the amusingness of the game. Furthermore, the video display unit 110 also displays information on the game rules and how to operate. A speaker 112 and a lamp 114 are provided on the side and top surfaces, respectively, of the top box 30. The slot machine 10 provides sound effect or flashing light through the speaker 112 or the lamp 114, which enhances the amusingness of the game.

A ticket printer 120, a keypad 122, and a data display device 124 are provided in the lower part of the video display unit 110.

The ticket printer 120 prints, on a ticket, a bar code containing the credit data, date and time, and an ID number of the slot machine 10 to output the barcode ticket. The player can exchange the barcode ticket with bills or the like at a predetermined location in a gaming facility (e.g., from a casher in a casino).

The keypad 122 has a plurality of keys. The operation of the plurality of keys by the player allows the various instructions pertinent to the issuance of the ticket. The data display device 124, which has a fluorescent display tube, LEDs, or the like, displays data input by the player through the keypad 122.

<<<Electrical Configuration of the Slot Machine>>>

Figure 3:
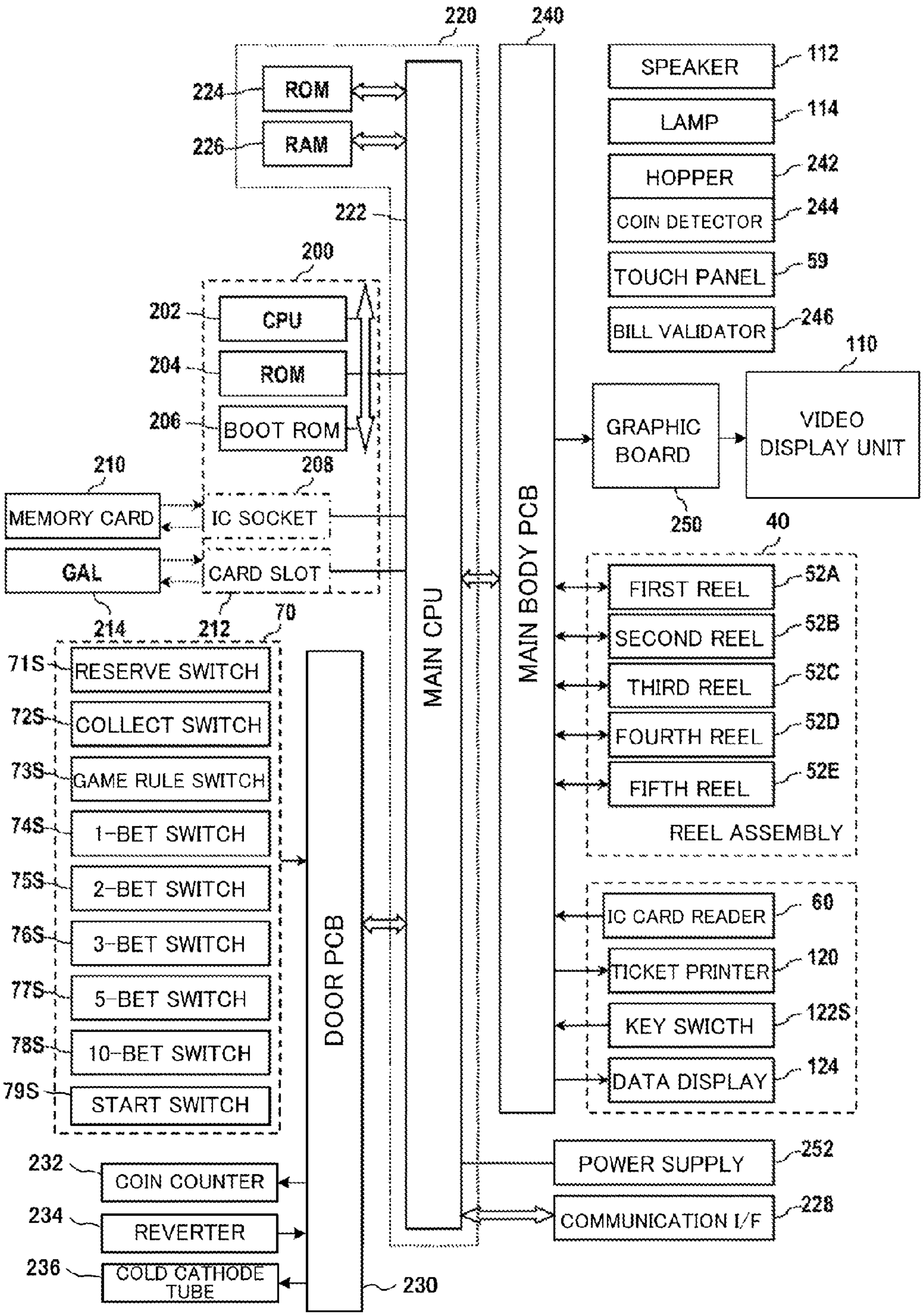
FIG. 3 is an electrical block diagram of the slot machine shown in FIG. 1.

FIG. 3 is an electric block diagram of the slot machine 10 shown in FIG. 1. The slot machine 10 includes a game board 200, a motherboard 220, a door PCB 230, and a main body PCB 240.

A game board 200 includes a CPU 202, a ROM 204 accessible from the CPU 202 through an internal bus, and a boot ROM 206 accessible from the CPU 202 by an internal bus. The game board 200 includes an IC socket 208 which can accommodate a memory card 210 and communicate therewith, and a card slot 212 provided corresponding to a Generic Array Logic (GAL) 214.

The memory card 210 includes a non-volatile memory and stores a game program and a game system program.

The IC socket 208 is configured to be removably attached by the memory card 210. The IC socket 208 is connected to a motherboard 220 by an IDE bus. The game executed in the slot machine 10 can be changed by replacing the memory card 210 with another one. The game executed in the slot machine 10 also can be changed by withdrawing the memory card 210 from the IC socket 208, writing another program into the memory card 210, and then inserting the memory card 210 into the card slot 208 again.

The GAL 214, which is a type of a Programmable Logic Device (PLD) having a fixed OR array structure, has a plurality of input ports and output ports. Upon receiving a predetermined data through the input ports, the GAL 214 outputs data corresponding to the input data through the output ports.

The card slot 212 is configured in such a manner that the GAL 214 can be inserted into the card slot 212 or detached from the IC socket 212, and is connected to the motherboard 220 by a PCI bus.

The CPU 202, the ROM 204, and the boot ROM 206 interconnected by the internal bus are connected to the motherboard 220 by the PCI bus. The PCI bus enables signal transmission between the motherboard 220 and the game board 200, and supply of power from the motherboard 220 to the game board 200.

The ROM 204 stores a program. The boot ROM 206 stores a preliminary authentication program, a boot code to be used by the CPU 202 for activating the preliminary authentication program, and the like. The authentication program is a falsification check program for authenticating that the game program and the game system program are legitimate. The preliminary authentication program is a program for authenticating that the authentication program is legitimate. In the authentication program and the preliminary authentication program, a process for verifying that the program of interest is not falsified.

A commonly available main board is used as the motherboard 220, and thus the motherboard 220 executes the game program and the game system program. The motherboard 220 includes a main CPU 222, a ROM 224, a RAM 226, and a communication interface 228.

The ROM 224 is a memory device for storing a program to be executed by the main CPU 222, such as BIOS. The program and data are maintained in the ROM 224 permanently. The ROM 224 may be a flash memory. The BIOS program is executed by the main CPU 222 to initialize peripheral devices. Also, the BIOS program loads the game program and the game system program stored in the memory card 210 through the game board 200. The ROM 224 may be rewritable. Furthermore, write-protected one might be used as the ROM 224 as well.

The RAM 226 stores data and programs which are used while the main CPU 222 is in operation. For example, when the game program, the game system program, or the authentication program is to be loaded, the RAM 224 can store such programs. Also, the RAM 226 is provided with working space for the execution of the programs. For example, the space stores the number of bets, the payout amount, the credit amount, etc., which are maintained during the execution of the game. Also, a plurality of tables for defining symbols, symbol codes, winning combinations, and their probabilities is maintained during the execution of the game. Further, a symbol code determination table is stored in the RAM 226. The symbol code determination table stores mapping information between symbol codes and random number which are used for determining symbols based on random numbers. In particular, the RAM 226 maintains a mode flag along with a game counter. The mode flag is the flag indicating the game mode. The game counter is the count value indicating the number of unit games which has already been executed in the chance mode or the number of remaining unit games in the chance mode.

Also, the RAM 226 stores count values of a plurality of counters. The plurality of counters include a bet counter, a payout amount counter, a credit amount counter, and a chance mode game counter which counts the number of unit games in the chance mode. In addition, some of the count values may be maintained in an internal register of the main CPU 222.

The main CPU 222 communicates with an external controller through a communication interface 228. The external controller includes, for example, a server connected through a communication channel (not shown).

The motherboard 220 is connected to the door PCB 230 and the main body PCB 240. The motherboard 220 can communicate by means of USB with the door PCB 230 and the main body PCB 240. The motherboard 220 is connected to a power supply 252. The main CPU 222 of the motherboard 220 boots up and operates using the power supplied from the power supply 252. The motherboard 220 passes a part of power to the game board 200 through the PCI bus so as to boot up the CPU 202. The door PCB 230 and the main body PCB 240 are connected to an input device. The input device include a switch, a sensor, and peripheral devices of which operation are controlled by the main CPU 222. The door PCB 230 is connected with a control panel 70, a coin counter 232, a reverter 234, and a cold cathode tube 236.

The control panel 70 has a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch 79S, each of which is provided corresponding to various buttons 71-79. Upon detecting the fact that the various buttons 71 to 79 are pressed, each of the switches 71S to 79S outputs a signal to the main CPU 222.

The coin counter 232 and the reverter 234 are provided in the coin insertion unit 80. The coin counter 232 determines whether or not the coins inserted into coin insertion unit 80 is legitimate in terms of material, shape, or the like. The coin counter 232 outputs a signal to the main CPU 222 if detecting a legitimate coin. The coins which are determined as being illegitimate are discharged to the coin tray 92. The reverter 234 operates based upon a control signal from the main CPU 222. The reverter 234 distributes the coins that are determined by the coin counter 232 as being legitimate into either a hopper 242 or a cash box (not shown). The coins are guided into the hopper 242 when the hopper 242 is not filled with coins. Contrarily, the coins are guided into the cash box when the hopper 242 is filled with coins.

The cold cathode tube 236 is provided on the rear surface of the video display unit 110. The cold cathode tube 236 functions as a backlight and emit light based on a control signal from the main CPU 222.

The main body PCB 240 is connected to the speaker 112, the lamp 114, the hopper 242, a coin detector 244, the touch panel 59, a bill validator 246, the reel assembly 50, the IC card reader 60, a graphic board 250, the ticket printer 120, a key switch 122S, and the data display 124.

The lamp 114 is turned on/off based upon a control signal from the main CPU 222. The speaker 112 outputs a sound such as BGM based upon the control signal from the main CPU 222.

The hopper 242, which operates based upon a control signal from the main CPU 222, pays out the designated payout amount of coins to the coin tray 92 through a coin payout outlet (not shown) formed between the lower glass part 90 and the coin tray 92. The coin detector 244 detects coins paid out from the hopper 242 to output a detection signal to the main CPU 222.

The touch panel 59 detects a position touched by the player, and then provides the main CPU 222 with a position detection signal corresponding to the detected position. Upon detection of a legitimate bill, the bill validator 246 provided in the bill insertion unit 82 provides the main CPU 222 with a bill detection signal corresponding to the bill amount.

The graphic board 250 controls both the video display unit 110 and the display panel 58 of the symbol display unit 40 in response to a control signal from the main CPU 222. The graphic board 250 includes a Video Display Processor (VDP) for generating video data, and a video RAM for temporarily storing the video data. The video data may be generated from the game program stored in the RAM 224.

The IC card reader 60 reads out data stored in the IC card inserted into the IC card socket 208 to provide the read-out data to the main CPU 222. The IC card reader 60 writes the data supplied to the main CPU 222 into the ID card.

The ticket printer 120 prints on a ticket the barcode containing information of the credit amount stored in the RAM 226, date and time, the identification number of the slot machine 10, and the like, in response to the control signal from the main CPU 222 in order to output the barcoded ticket.

The key switch 122S, which is provided behind the keypad 122, outputs a key detection signal to the main CPU 222 when the keypad 122 is pressed by the player.

The data display device 124 displays information on the information that is input through the keypad 122 in response to a control signal from the main CPU 222.

Figure 4:
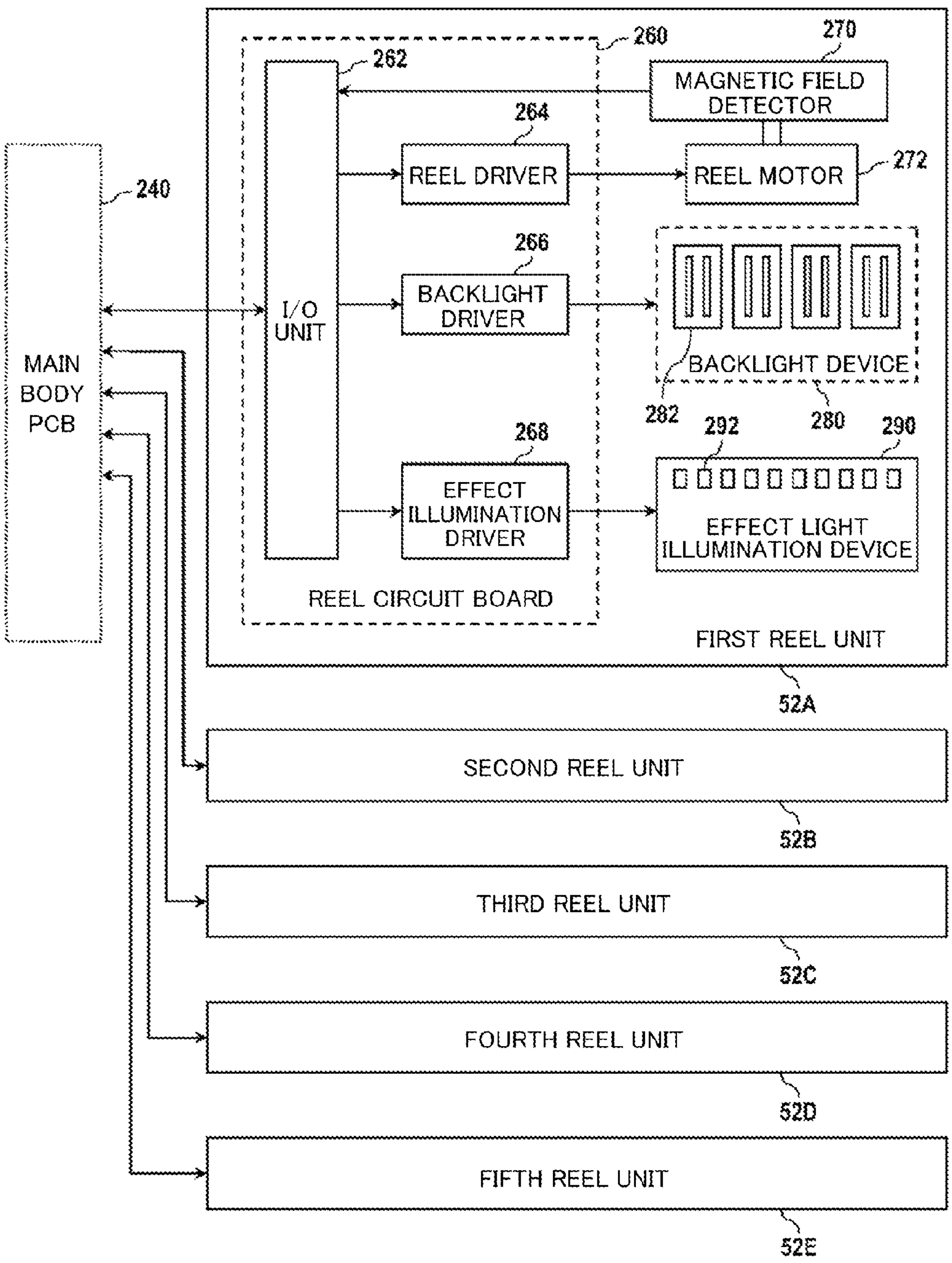
FIG. 4 is a block diagram of an electric circuit in the reel assembly.

The main body PCB 240 is electrically connected to the reel assembly 50. The reel assembly 50 includes the first to fifth reels 52A to 52E as mentioned above. FIG. 4 is a block diagram of an electric circuit in the reel assembly 50. Each of the reels 52A to 52E is provided on a reel circuit board 260. The reel circuit board 260 includes an 20 input/output (I/O) unit 262 capable of communicating with the main body PCB 240, a reel driver 264 connected to the I/O unit 262, a backlight driver 266, and an effect illumination driver 268.

The I/O unit 262 is connected to a magnetic field detector 270. The magnetic field detector 270 includes a magnetic sensor for sensing magnetic field intensity to output a magnetic detection signal proportional to the magnetic field intensity, and a sensor fixation part for fixing the magnetic sensor to a predetermined position. The magnetic sensor detects the intensity of the magnetic field generated by a magnet. The magnet is provided at a rotating axis of a reel motor 272 to rotate with the reel 52A.

The reel driver 264 supplies electric power to the reel motor 272. The backlight driver 266 supplies electric power individually to each light source 282 in a backlight device 280. The effect light illumination driver 268 supplies electric power individually to each light source 292 of an effect light illumination device 290.

Since the second to fifth reels 52B to 52E have the same configuration as the first reel 52A, detailed description thereof will be omitted.

<<Function of the Game Program>>

Figure 5:
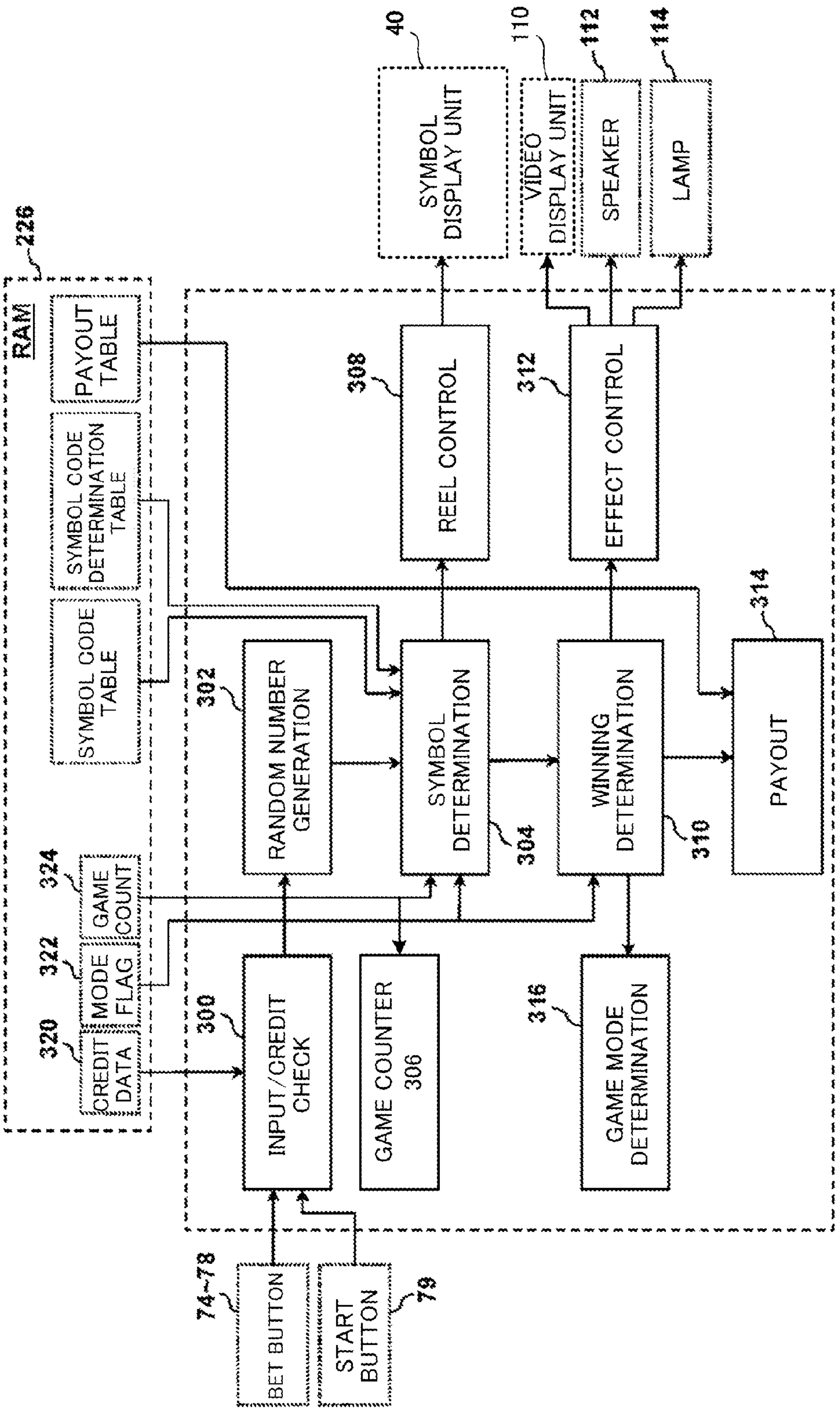
FIG. 5 is a block diagram showing the function of a game program executed by a main CPU 222 on the mother board 220.

FIG. 5 is a functional block diagram of the game program executed in the main CPU 222 of the motherboard 220. When the power is supplied to the slot machine 10, the main CPU 222 reads the authenticated game program and game system program from the memory card 210 through the game board 200, and writes the programs into the RAM 226. The game program is executed in a state being loaded into the RAM 226 in such a manner.

According to the preferred embodiment, the game program includes a input/credit check process part 300, a random number generating process part 302, a symbol determination process part 304, a game counter process part 306, a reel control process part 308, a winning determination process part 310, an effect control process part 312, a payout process part 314, and a game mode determination process part 316.

<Input/Credit Check Process Part 300>

The input/credit check process part 300, in an idle state where the reels 52A to 52E are stopped, continuously checks whether or not any of the "BET" buttons 74 to 78 or the "START" button 20 79 is pressed. If the "BET" buttons 74 to 78 or the "START" button 79 is pressed, the input/credit check process part 300 checks whether or not there remains any credit for the player on the basis of the credit data 320 stored in the RAM 226. If at least one credit for the player remains, the input/credit check process part 300 call the random number generating process part 302.

Subsequently, the random number generating process part 302 generates random numbers which are used in the symbol determination process part 304. In the present embodiment, the random number generating process part 302 generates five random numbers. Each of the five random numbers is used in the first to fifth reels 52A to 52E, respectively.

After five random numbers are completely extracted, the symbol determination process part 304 determines a to-be-stopped symbol for each of the reels 52A to 52E with reference to the symbol code determination table stored in the RAM 226. The symbol determination process part 304 uses five random numbers to determine five to-be-stopped symbols for the reels 52A to 52E to be appeared in the display window 56 of the symbol display unit 40 for each of the reels 52A to 52E.

In particular, the symbol determination process part 304 checks the current gaming mode with reference to the mode flag 322 stored in the RAM 226. The process of determining symbols in the normal mode is different from the process of determining symbols in the chance mode. In the normal mode, the symbol determination process part 304 uses a predetermined symbol code determination table to determine the symbol using the random number in accordance with a predetermined procedure. Contrarily, in the chance mode, the symbol determination process part 304 sequentially changes the symbol code determination table for each unit game to vary the symbol determination process. The sequential varying of the symbol code determination table can increase winning combinations including at least one specific symbol as the chance mode game continues. The number of chance mode games executable within a single session is limited to a predetermined number of times, e.g., eight times. In order to limit the number of times of chance mode games, the game counter process part 306 counts the number of times of chance mode games which have already been executed and the number of times of chance mode games which remain in that session. The value of the game count 324 is stored in the RAM 226. The game counter process part 306 may reside in the symbol determination process part 304.

The reel control process part 308 controls the reel assembly 50 by providing stop position information corresponding to the determined symbols. In this way, the reels 52A to 52E spins, followed by stopping at the position designated by the stop position information. More specifically, the symbols scroll along with the spinning of the reels 52A to 52E. Then, the reels 52A to 52E are stopped in such a manner that the determined symbols are rearranged in the central position vertically in the window 56 of the symbol display unit 40.

The winning determination process part 310 determines whether or not a predetermined winning combination is achieved by the rearranged symbols. In case that a winning combination is achieved by the rearranged symbols, the effect control process part 312 controls the symbol display unit 40 and the other devices. The other devices include the speaker 112, the lamp 114, the video display unit 110, etc. The effect includes video and audio effect, backlight change, and lighting effect. Also, the payout process part 314 determines payout amount in response to the achieved winning combination to give the player that payout.

Furthermore, each time the unit game is completed, the game mode determination process part 316 determines the game mode of the next unit game. The game mode determination process part 316 changes the mode from the normal mode into the chance mode when a trigger event occurs in the rearranged symbols. On the other hands, the game mode determination process part 316 changes the mode from the chance mode into the normal mode when an end condition is satisfied. In the other cases, the game mode determination process part 316 maintains the previous game mode. The game mode determination process part 316 may be run in the winning determination process part 310.

<<Symbols, Winning Combinations, and Pay Lines>>

Figure 6:
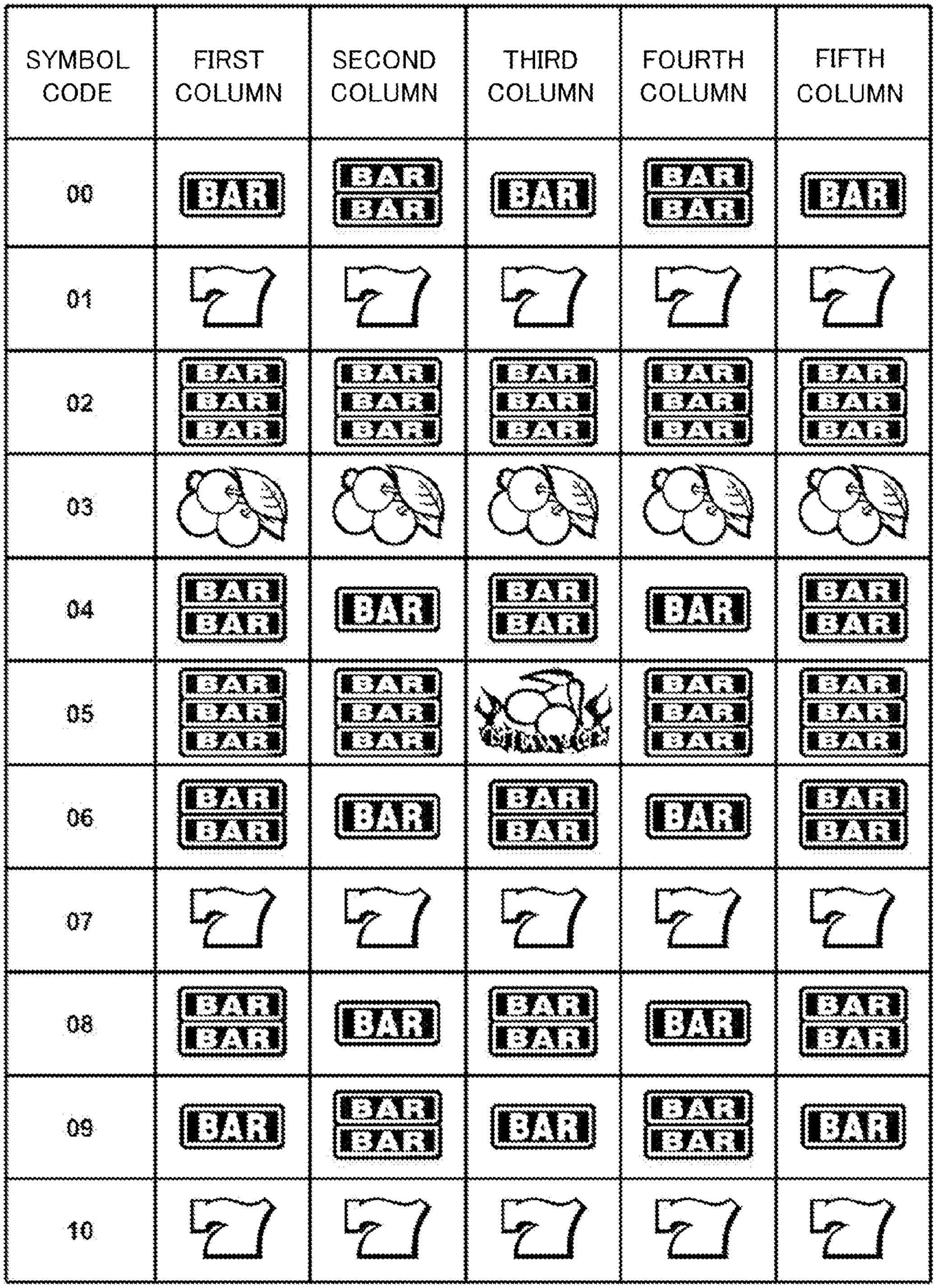
FIG. 6 illustrates an example of a symbol code table specifying symbols provided on the outer peripheral surfaces of the reels 52A to 52E.

FIG. 6 shows an example of a symbol code table specifying symbols provided on the outer peripheral surfaces of the reels 52A to 52E.

The symbols provided on each of the reels 52A to 52E form a symbol column composed of eleven symbols. As described hereinbelow, the alignment of symbols provided on each of the reels 52A to 52E are referred to as first to fifth symbol columns, respectively. In the present embodiment, the symbol columns include six types of symbols. The six types of symbols are "7", "BAR", "DOUBLE BAR", "TRIPLE BAR", "CHERRY", and "CHANCE CHERRY". In each of the symbol columns, each of the symbols has an assigned code ranging from "00" to "10." For example, the first symbol, "BAR", in the first symbol column is assigned a code "01." The second symbol, "7", in the first symbol column is assigned a code "00." The eighth symbol, "7", in the first symbol column is assigned a code "07."

Three consecutive symbols in each symbol column can be appeared in the display window 56 of the symbol display unit 40 to form a symbol matrix having three rows and five columns. Each time the "BET" buttons 74 to 78 or the "START" button 79 are pressed, the reels 52A to 52E on which the symbols are provided starts spinning, and thus the symbols appear in the display window 56 in the manner in which the symbols are scrolled vertically. After a predetermined time period elapses, the scroll of the symbols stops to rearrange the symbol, and then the symbol matrix is formed in the display window 56.

<"CHANCE CHERRY" Symbol>

Figure 7:
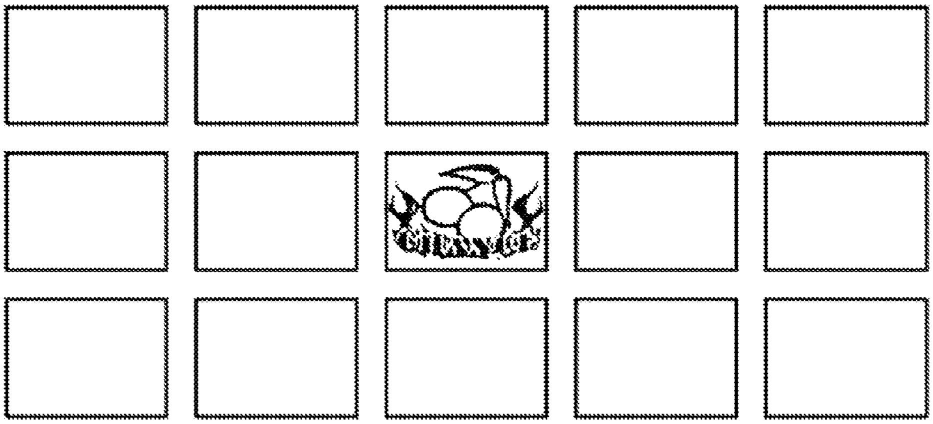
FIG. 7 is a diagram showing the state where a trigger symbol is located in a predetermined position, and a diagram showing a trigger condition for transition to the chance mode.

The "CHANCE CHERRY" symbol appearing only in the third symbol column serves as a trigger symbol which shifts the game mode into the chance mode. In the present embodiment, the "CHANCE CHERRY" symbol has a shape similar to the "CHERRY" symbol, but is configured by the image in which the cherry image is integral with a background image of flaming fire surrounding the cherry image. The chance mode is initiated after the "CHANCE CHERRY" symbol appears at the position of the second row and third column in the display window 56, as shown in FIG. 7. The condition for returning of the game mode into the normal mode will be described below.

A plurality of kinds of winning combinations of symbols (referred to as "winning combinations" hereinbelow) for giving benefit to the player is preset. The benefits given to the player include a predetermined amount of payout by increasing of credits or discharging of coins.

Figure 8:
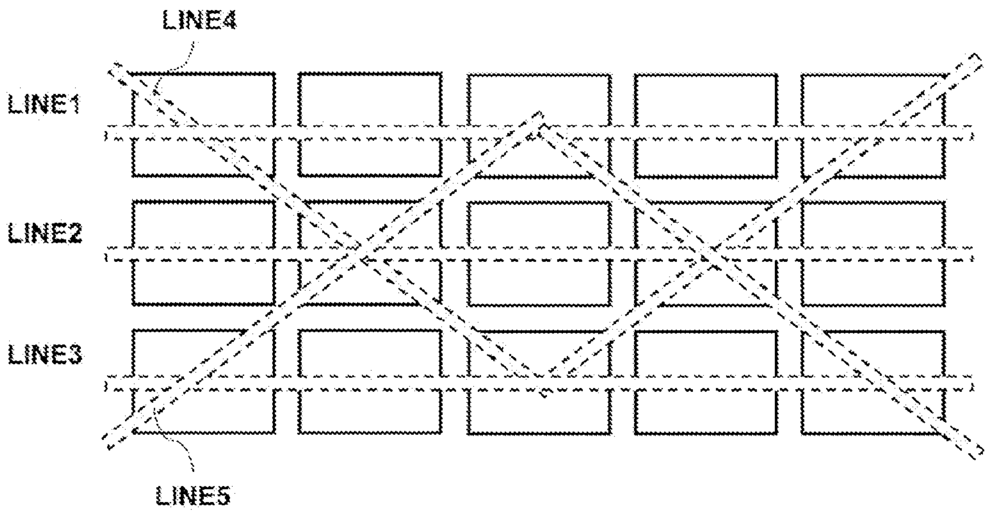
FIG. 8 is a diagram showing pay lines of the slot machine according to the first embodiment.

FIG. 8 shows pay lines set in a preferred embodiment of the present invention. In the present embodiment, five pay lines are set for the symbol matrix. First to third pay lines extend horizontally across the symbol stop positions in the first to third rows, respectively, in the symbol matrix. A fourth pay line extends in a "V"-shaped line joining the symbol stop position in the first row and the first column, the symbol stop position in the second row and the second column, the symbol stop position in the third row and the third column, the symbol stop position in the second row and the fourth column, and the symbol stop position in the first row and the fifth column. A fifth pay line extends in a "reversed V"-shaped path joining the symbol stop position in the third row and the first column, the symbol stop position in the second row and the second column, the symbol stop position in the first row and the third column, the symbol stop position in the second row and the fourth column, and the symbol stop position in the third row and the fifth column.

Each of the pay lines can be activated depending on the player's choice. However, all the five pay lines can be activated irrespective of the betting amount or the player's choice. The total number of pay lines can vary depending on the size of the symbol matrix, and the other pay lines can be set appropriately.

<<Gaming Modes: Normal Mode and Chance Mode>>

The slot machine 10 selectively executes two modes: normal mode and chance mode. The processing of the game in the chance mode is similar to that in the normal mode in most cases. However, the payouts for at least some of the winning combinations in the chance mode are different from those in the normal mode. Also, producing effects such as video effect and sound effect can differ between the two game modes. In addition, the unit game executed in the normal mode may be herein referred to simply as a normal mode game. Likewise, the unit game executed in the chance mode may be referred to simply as a chance mode game.

<<State Transition of Game>>

Figure 9:
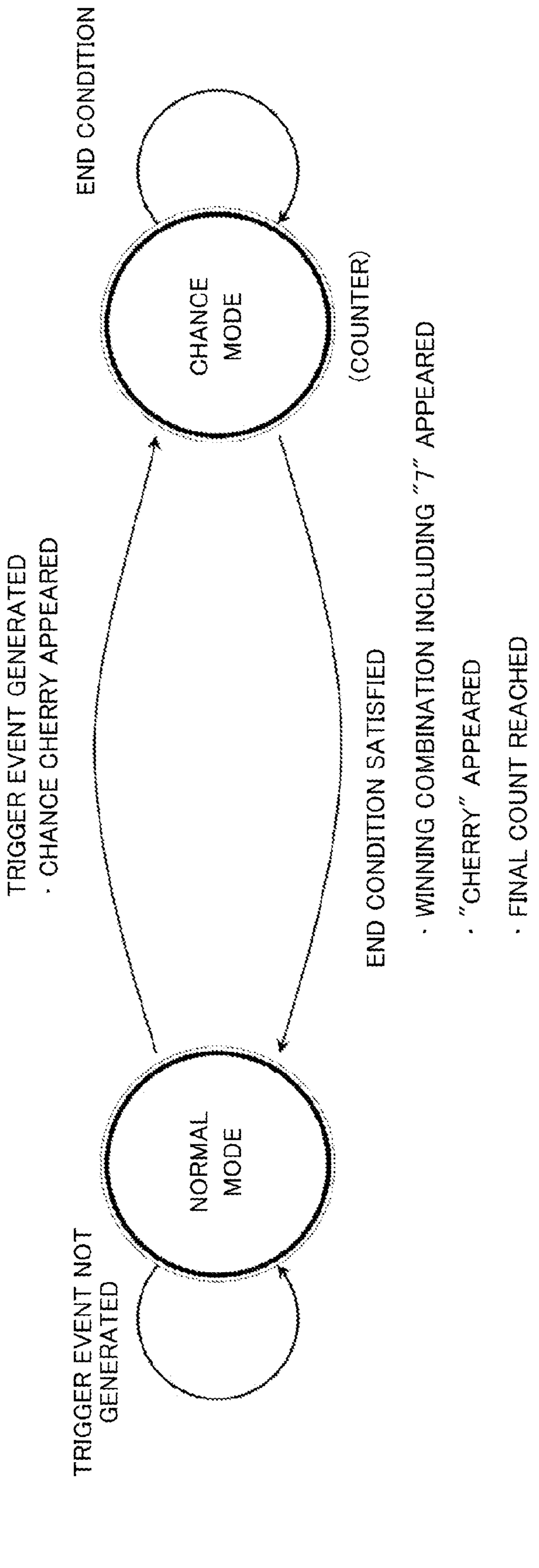
FIG. 9 is a state transition diagram of the slot machine according to the first embodiment.

FIG. 9 is a state transition diagram of the slot machine 10.

Usually, the slot machine 10 is in a state of the normal mode, and maintains the normal mode state unless a trigger event occurs. When the trigger event occurs during the normal mode, a state transition occurs to shift the game mode to the chance mode. In a preferred embodiment, the trigger event is the appearance of the "CHANCE CHERRY" symbol at the position in the second row and third column of the symbol matrix.

When the game mode proceeds to the chance mode, the slot machine 10 maintains this state unless an end condition is satisfied. In an exemplary embodiment, one of the end conditions is that one of winning combinations comprised of the "SEVEN" symbols is achieved. Another end condition is that the "CHERRY" symbols of the symbol matrix formed by the rearranged symbols appear in the one of the pay lines. Meanwhile, after the game mode proceeds to the chance mode, the slot machine 10 sets a game counter which counts up or down each time the unit game in the chance mode is executed. The maximum number of unit games in the chance mode is eight in a single chance mode session. The term "chance mode session" herein denotes the period from the time when the game mode proceeds to the chance mode (when the chance mode starts) to the time the game mode returns to the normal mode (when the chance mode ends) and the state therein. Thus, if the value of the game counter reaches eight upon counting up or the value of the game counter reaches zero upon counting down, the slot machine 10 makes the "CHERRY" symbol appear in the symbol matrix formed by the rearranged symbols, or makes one of the winning combinations comprised of the "SEVEN" symbols, in order to satisfy the end condition. For example, such an operation repetitively executes the process of determining symbol combination until the symbol combination satisfying the end condition is acquired. When the end condition is satisfied, the game mode returns to the normal mode and the unit game restarts in the normal mode.

<<Symbol Code Determination Tables and Payout Tables>>

Regardless of the game modes, the symbol combination is determined based on a plurality of tables stored in the RAM 224 of the motherboard 220. As mentioned above, the RAM 226 stores at least one of the symbol code determination table and/or the symbol determination table.

Figure 10:
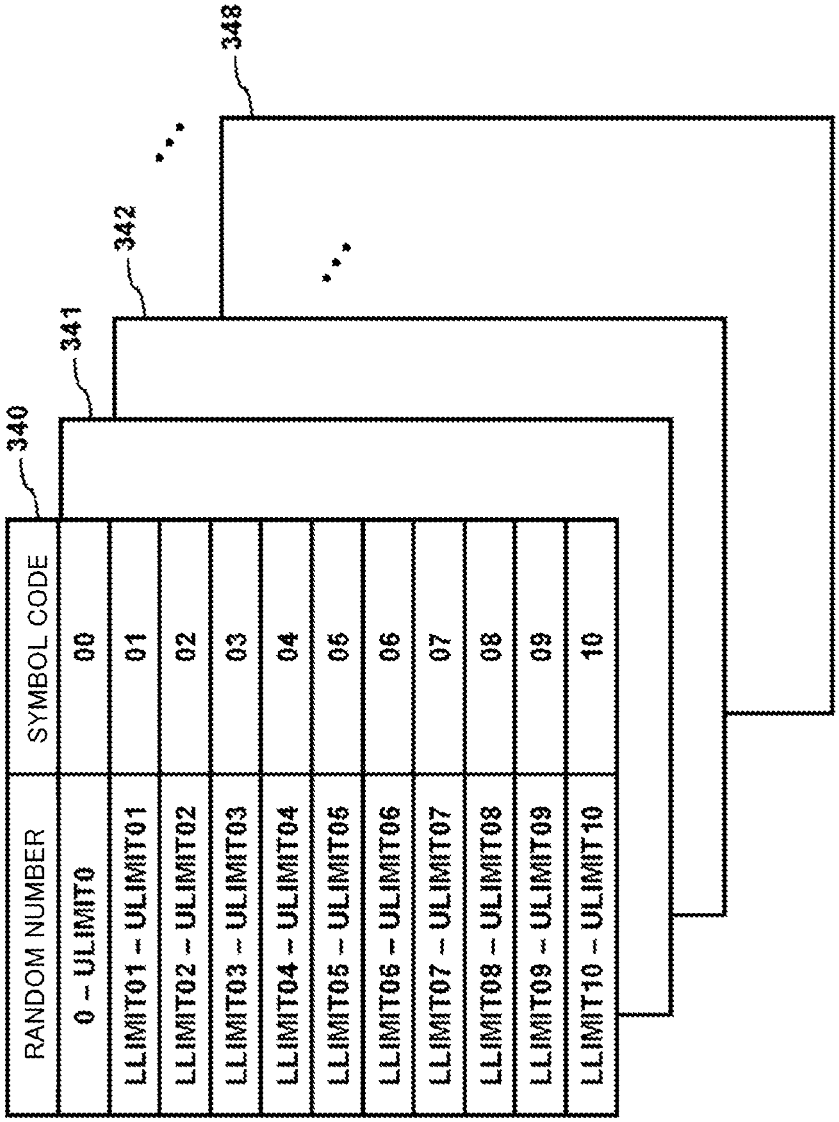
FIG. 10 is a diagram showing an example of a data field of a symbol code determination table.

FIG. 10 shows an example of configuration of the symbol code determination table.

The symbol code determination tables 340 to 348 stores a mapping relationship between the random numbers generated by the random number generation process part 302 and the symbol codes indicating each of the symbols as shown in FIG. 6. Thus, each time a random number is generated by the random number generation process part 302, the symbol determination process part 304 determines a symbol code associated with one symbol with reference to the symbol code determination tables 340 to 348. The wider a random number range is, the higher the probability that the symbol associated with the widened range is determined becomes. Also, as the total range of the random numbers is widened, the probability of determining the symbol code can be controlled more precisely.

In the symbol code determination tables 340 to 348, the table 340 is used for determining symbols in the normal mode, and the tables 341 to 348 are used for determining symbols in the first to eighth chance mode games, respectively.

In the case that the first to fifth symbol columns are different from one another, each of the symbol code determination tables 340 to 348 may be further divided into five tables each of which correspond to its own symbol column. Additionally, all the tables can be integrated into a single table having 45 data fields, as shown in FIG. 11. Depending on the game modes and symbol columns, the symbol determination process part 304 can choose and utilize one data field among the 45 data fields. Each of 45 data fields can be regarded herein as a separate table.

In the case that two or more symbol columns are the same as each other, the symbols can be determined in those columns using a symbol code determination table in common with each other. For example, in the example of FIG. 6, the second symbol column has the same symbol sequence as that in the fourth symbol column. Thus, the symbol code determination table for the second column can be used for the symbol determination in the fourth column. Similarly, since the first symbol column has the same symbol sequence as that in the fifth symbol column. Thus, the symbol code determination table for the first column can be used for the symbol determination in the fifth column.

Once the symbol determination process part 304 determines five symbols in a predetermined row (e.g., the second row) in the symbol matrix to determine all the symbols constituting the symbol matrix, the winning determination process part 310 determines whether or not any of the winning combinations is achieved, and the game mode determination process part 316 determines the game mode of a subsequent unit game.

Figure 12:
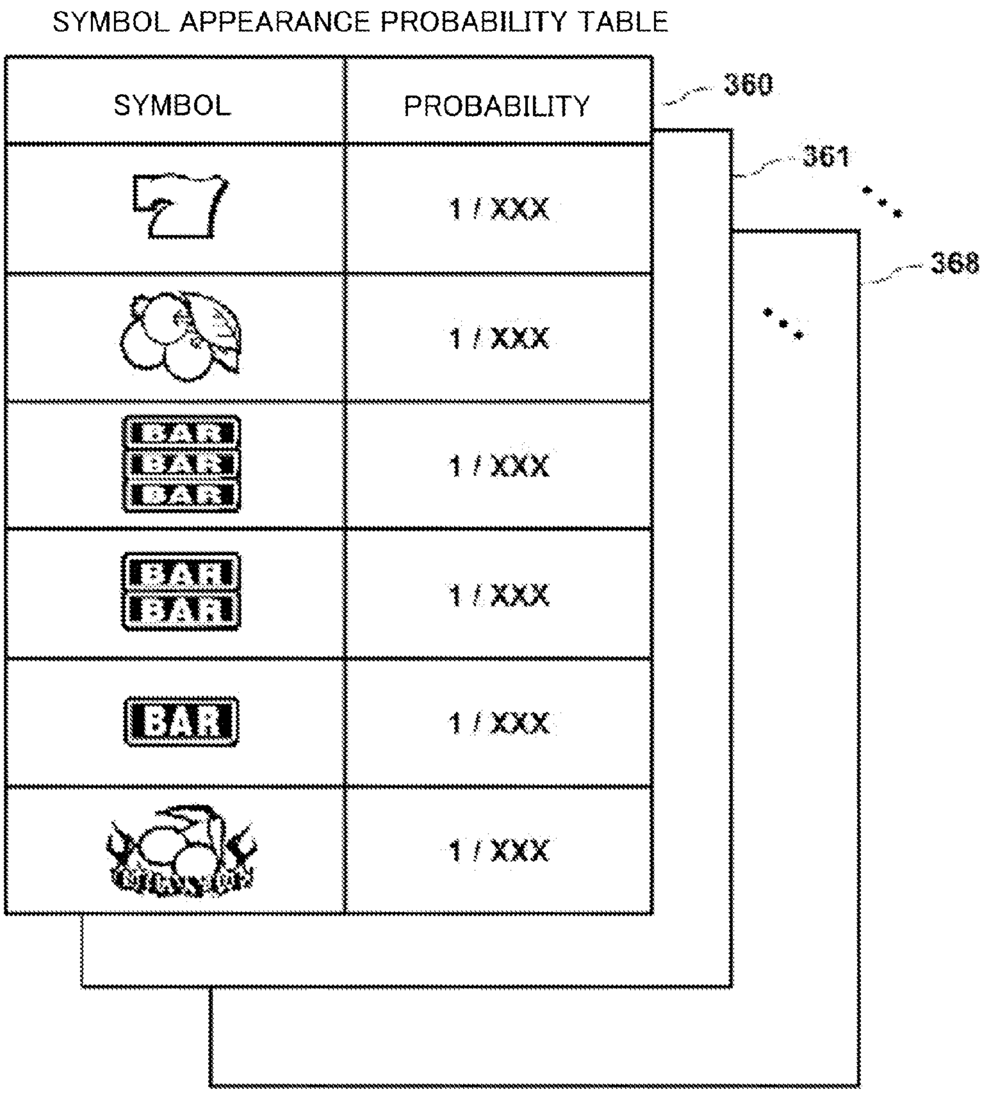
FIG. 12 is a diagram showing an example of symbol determination tables.

FIG. 12 shows an example of the symbol determination table. The symbol determination tables 360 to 368 specify the probabilities that each symbol appears in the pay lines. The symbol code determination tables 340 to 348 shown in FIG. 10 can be prepared based on the symbol determination tables 360 to 368. Among the symbol determination tables 360 to 368, the symbol determination table 360 is used for the normal mode, and the symbol determination tables 361 to 368 are used in the first to eighth chance mode games, respectively.

Similarly to the symbol code determination tables 340 to 348, each of the symbol determination tables 360 to 368 may be divided into five tables each of which corresponds to its own symbol column. Furthermore, all the tables can be integrated into a single table having 45 data fields as well.

Figure 13:
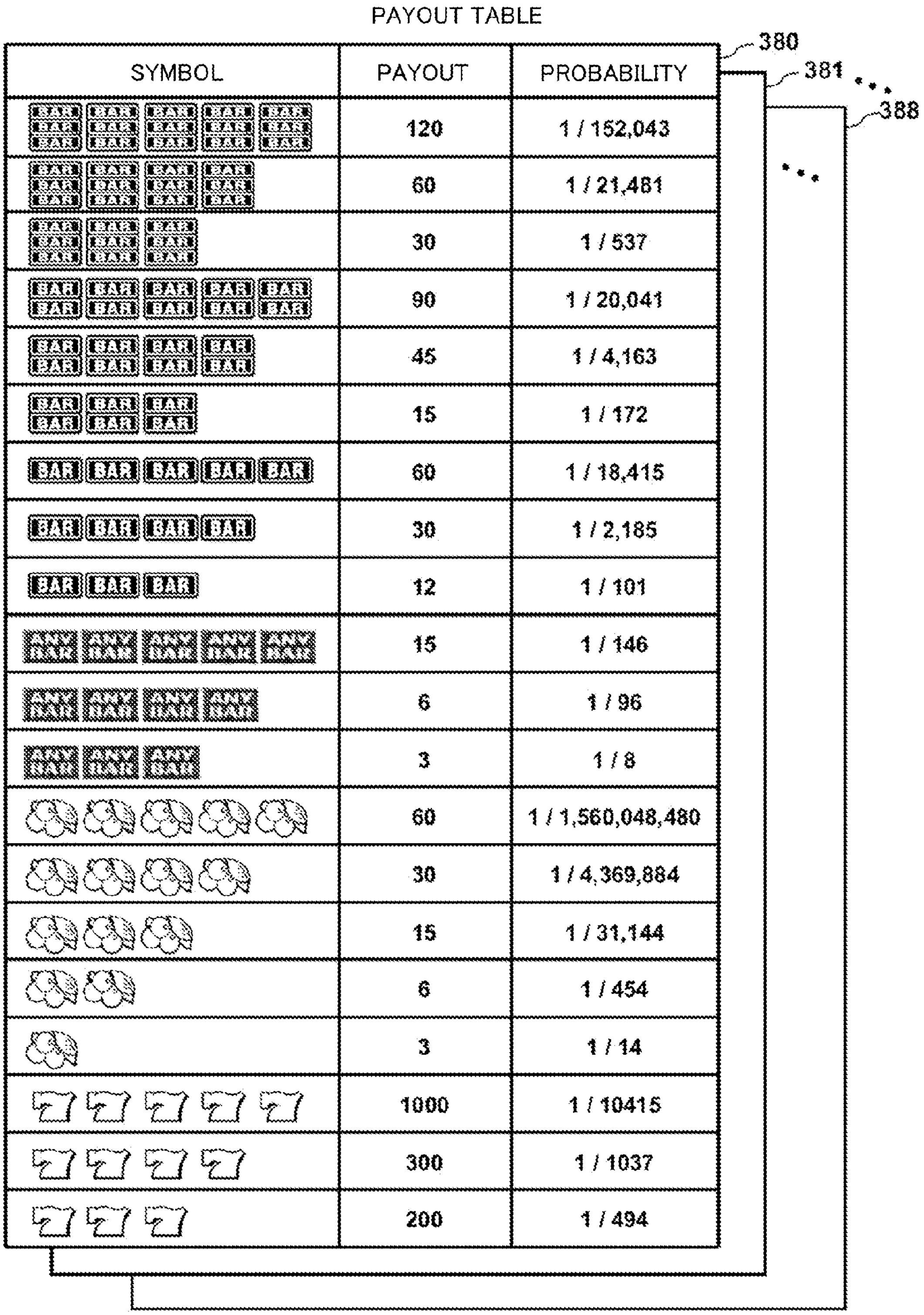
FIG. 13 is a diagram showing an example of payout tables.

The probability that each symbol appears in pay lines influences on the probabilities that the winning combinations are achieved. Conversely, the symbol determination tables 360 to 368 can be generated based on the probabilities of the winning combinations. The relationships between the winning combinations and respective probabilities can be summarized as payout tables 380 to 388 shown in FIG. 13. The payout tables 380 to 388 define the winning combinations along with their respective payouts. The payout tables 380 to 388 are prescribed separately for the normal mode games and the chance mode games. In particular, it is preferable to separately prescribe the payout tables for use in the eight games in the chance mode. Among the payout tables 380 to 389, the payout table 380 is used for the normal mode games, and the payout tables 381 to 388 are applicable for the first to eighth chance mode games, respectively. All the payout tables 380 to 388 can be integrated into a single table as well.

Each time the unit game is executed, the winning determination process part 310, which is contained in the game program and executed by the main CPU 222, determines whether or not any winning combination is achieved in the pay lines. If the winning combination defined in the payout tables 380 to 388 is included in one of the pay lines, the winning determination process part 310 detects the winning combination and checks the payout amount with reference to the payout tables 380 to 388. The payout process part 314 pays out the determined amount. If, however, no winning combination is achieved by the symbols appeared on the pay line, it is determined to be so-called losing.

For example, in case where three “SEVEN” symbols appear in one of the pay lines LINE1 to LINE5 across the symbol columns, it is regarded as a winning combination of “THREE SEVEN” being achieved, and thus two hundred times the betting amount is paid out as the payout amount. The benefit of payout can be provided for the player by actually discharging coins to the coin tray 92, or adding the credits by the amount equivalent to the coin.

<<Probabilities of Winning in Chance Mode>>

As mentioned above, when the “CHANCE CHERRY” symbol appears at the position in the second row and third column in the symbol matrix, the game mode proceeds to the chance mode, and the chance mode is maintained until the end condition is satisfied. The end condition is that one of the winning combinations composed of “7” symbols is achieved, or that the “CHERRY” symbol that is formed by the rearranged symbols appears in one of the pay lines.

When the game mode proceeds to the chance mode, the game counter process part 306 shown in FIG. 5 sets a counter for counting the number of unit games that has been already executed in the chance mode, or the number of unit games that is to be executed in the chance mode. Then, the random number generation process part 304 generates the random numbers, and the symbol determination process part 304 determines to-be-stopped symbols using the generated random numbers with reference to the symbol code determination tables 341 to 348. The symbol determination process part 304 uses the symbol code determination table 301 in the unit game in the initial (the first) chance mode. As the chance mode game continues, the next symbol code determination table is used sequentially. When unit games are continuously executed for eight times in the chance mode (that is the last unit game in the chance mode in the present invention), the symbol determination process part 304 repeatedly executes the process of determining the symbol combination until the symbol combination satisfying the end condition is obtained if the symbol combination (including, for example, the combination of the to-be-stopped symbols, and the like) does not immediately satisfy the end condition.

The probabilities that the winning combinations are achieved according to the symbol code determination tables 301 to 308 are different from one another. In particular, the probabilities that a winning combination containing a predetermined specific symbol is achieved increase as the chance mode continues. The symbol code determination tables 301 to 308 have mapping data of the random numbers and the symbol codes. The mapping data is the data that causes the specific symbol related combinations to be more frequently achieved as the chance mode continues.

In the present embodiment, the specific symbol is the “7” symbol. That is, the probability that the “7” symbol appears in the symbol matrix or the symbol arrangement increases as the chance mode continues. The probability that the specific symbol, “7” symbol, appears can be higher than that in the normal mode. In addition, another symbol such as “CHERRY” symbol can be used as the specific symbol. In the description below, both the “7” and “CHERRY” symbols will be used as the specific symbols.

FIG. 14 shows the table in which the probabilities of winning combination associated with the specific symbol increases. As shown in the right table in FIG. 14, the probability that the winning combination of three “7” combination is achieved increases as the chance mode game continues. In other words, the probability of three “7” combination in the second unit game is higher than that in the first unit game. Also, the probability in the third unit game is higher than that in the second unit game. In such a manner, the probability of three “7” combination gradually increases until the unit game reaches the last (eighth) one. The similar are the other winning combinations of four “7” and five “7.”

As a result, the total probability of the winning combinations related with “7” symbol increases as the chance mode game is repetitively executed. In the example shown in the drawing, the probabilities of three "7", four "7", and five "7" combinations are 1/32.8, 1/67.2, and 1/672.0, respectively, in the first chance mode game. Thus, the total probability of the "7" symbol-related combinations is 1/21.7 (=1/32.8+1/67.2+1/672.0) in the first chance mode game. The total probability increases to 1/18.7 in the second unit game, and continues to increase to 1/3.1 in the eighth unit game.

Similar are the probabilities of the "CHERRY" symbol-related winning combinations. The total probability of the "CHERRY" symbol-related winning combinations is set to be zero in the initial (first) game in order to entertain the player, and the probability increases as the games go on. Specifically, the total probability of the "CHERRY" symbol-related combinations is 1/10.4 in the second unit game, and is 1/6.6 in the third unit game. After continuous increase of the probabilities, the total probability of the "CHERRY" symbol-related winning combinations reaches 1/1.5 in the eighth unit game.

The total probability of the winning combinations related with the "7" and "CHERRY" symbols is 1/21.7 in the initial (first) game. Thus, after the first unit game, the probability that the chance mode ends is about 4.61% (=1/21.7), and the probability that the chance mode continues is 95.39% (=1−1/21.7).

In the second unit game, the total probability of the winning combinations related with the "7" and "CHERRY" symbols increases to 1/6.7 (=1/10.4+18.7). Thus, after the second unit game, the probability that the chance mode ends is about 14.95% (=95.39%×1/6.7), and the probability that the chance mode continues is 85.05% (=95.39%×(1−1/6.7)). In the third unit game, the total probability of the winning combinations related with the "7" and "CHERRY" symbols increases to 1/4.6 (=1/6.6+15.1). Thus, after the third game, the probability that the chance mode ends is about 21.73% (=85.05%×1/4.6), and the probability that the chance mode continues is 78.27% (=85.05%×(1−1/4.6)).

The total probability of the winning combinations related with the "7" and "CHERRY" symbols increases to 1/1.0 (=1/1.5+3.1) in the last (eighth) unit game. Thus, the probability that the chance mode ends is 100% after the eighth unit game. When the unit game reaches the eighth one, the random number generation process part 302 and the symbol determination process part 304 repetitively generates the random numbers and determines the symbols, respectively, until the winning combination is achieved.

<<Operation of Slot Machine>>

The operation of the slot machine 10 will be described with reference to FIGS. 15 to 20.

Figure 15:
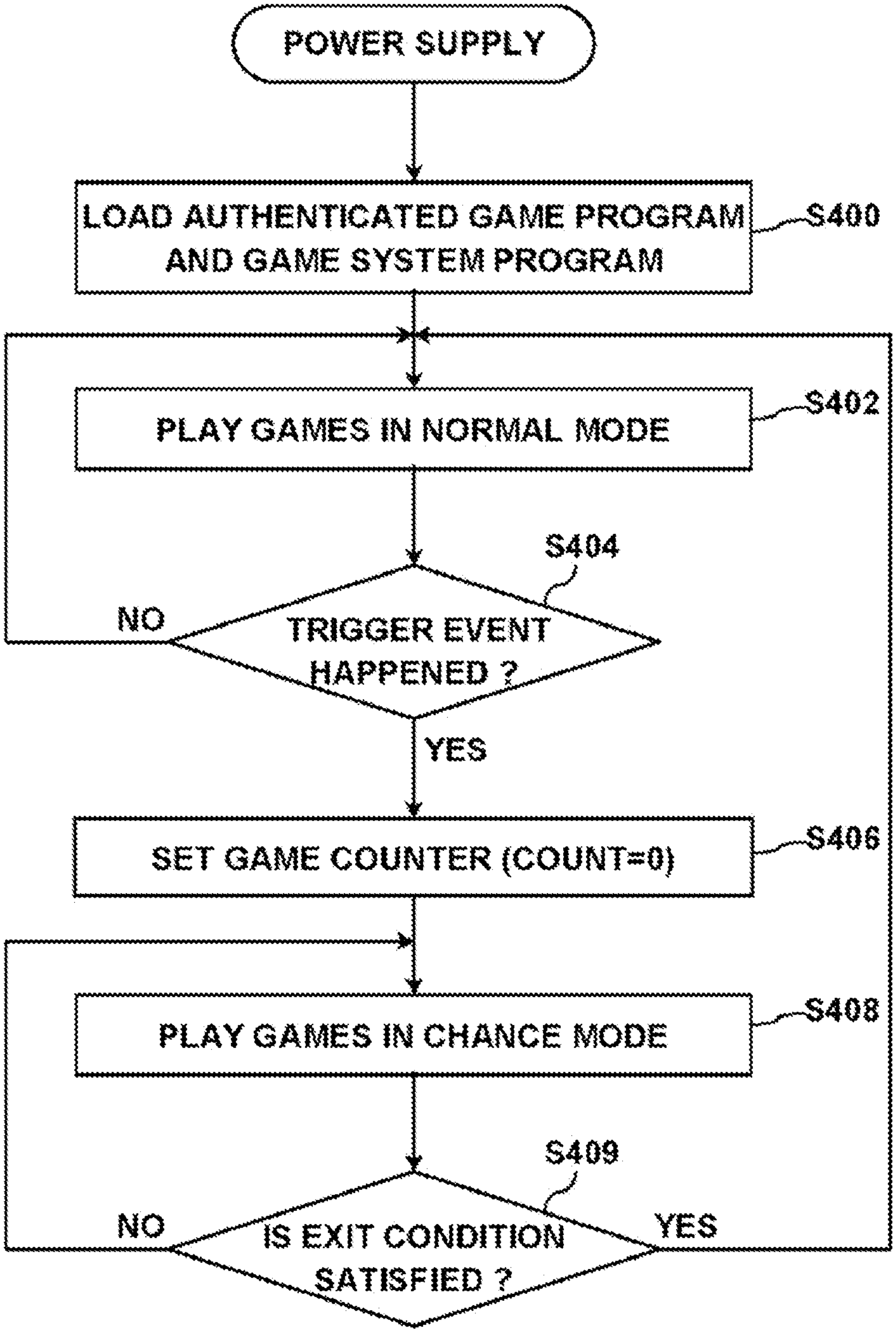
FIG. 15 is a flowchart showing a general process executed in the slot machine according to the first embodiment.

FIG. 15 shows the process executed in the slot machine 10.

When the power is supplied to the slot machine 10, the main CPU 222 loads the authenticated game program and game system program by reading the programs from the memory card 210 through the game board 200 and writing them into the RAM 226 (step S400). Subsequently, the main CPU 222 executes the game program and the game system program.

When the unit game is started by inserting the IC card into the IC card reader 60 or inserting coins into the coin insertion unit 80, the player can execute a new game based on the inserted coins or the stored bets. When the unit game is initially played after starting up the slot machine 10, the game mode goes into the normal mode. Thus, the main CPU 222 executes the normal mode game process for the initial unit game (step S402).

Whenever the normal mode game is completed, the game mode determination process part 316 executed by the main CPU 222 determines whether or not the trigger event occurs (step S404). Unless the trigger event occurs, the game mode of the subsequent game remains in the normal mode. Thus, the main CPU 222 returns the process to step S402 to execute the normal mode game process for the subsequent unit game.

If, however, determining in the determination process at step S404 that trigger event has occurred, the main CPU 20 changes the game mode of the subsequent game to the chance mode.

As mentioned above, in a preferred embodiment, the number of unit games that can be executed in a single session in the chance mode is limited to eight. The symbol code determination tables 341 to 348 are different from one another, and thus can be used for each of the unit games in the chance mode. Whenever each of the unit games in the chance mode is executed, the game counter increases the number of the unit games that has been already executed in the session, or decreases the number of the unit games that remains in the session. In the description below, it is assumed that the game counter increases the number of the unit games that has been already executed from zero. Thus, in the process at step S406, the main CPU 222 sets a game counter to be zero. Afterwards, the main CPU 222 executes the chance mode game process for the subsequent game (step S408).

Each time the unit game in the chance mode is completed, the game mode determination process part 316 determines whether or not the end condition is satisfied (step S409). Unless the end condition is satisfied, the game mode of the subsequent unit game remains in the chance mode. Thus, the main CPU 222 returns the process to step S408 to execute the chance mode game process for the subsequent unit game.

If, however, determining in the determination process at step S409 that the end condition is satisfied, the main CPU 222 returns the game mode of the subsequent unit game to the normal mode. Thus, the main CPU 222 returns the process to step S402 to execute the normal mode game process for the subsequent unit game.

Figure 16:
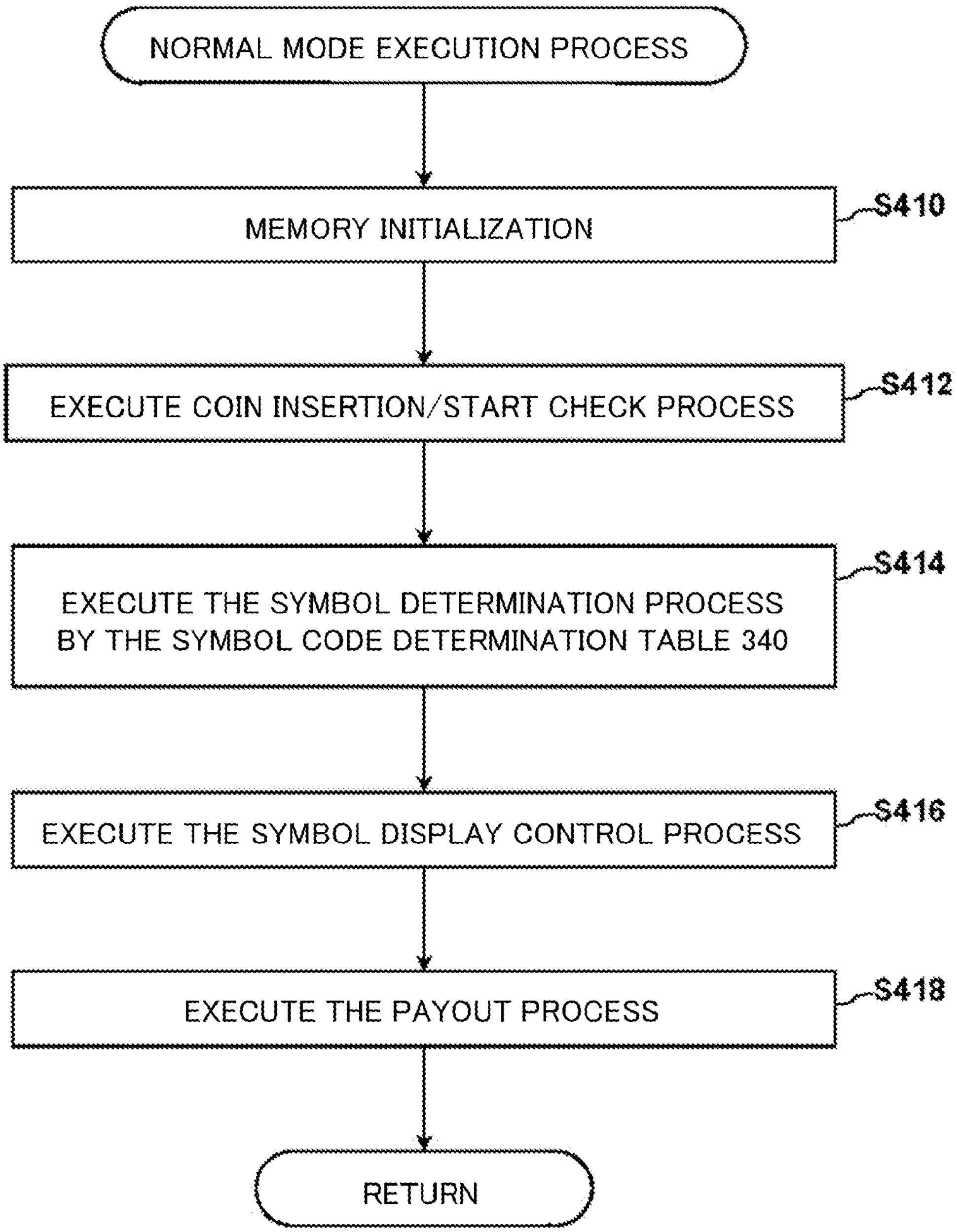
FIG. 16 is a flowchart showing the normal mode gaming process.

FIG. 16 shows the normal mode execution process, which shows step S402 shown in FIG. 15 in detail.

Each time a unit game is completed, the main CPU 222 executes memory initialization process (step S410). In this initialization process, the main CPU 222 clears unnecessary data and information from the temporary working area in the RAM 226. The unnecessary data and information includes the payout data, awarding or failure information, and the to-be-stopped symbol information determined in the previous unit game.

Subsequently, the main CPU 222 executes coin-insertion/start-check process (step S412). In this process, the main CPU 222 checks the entry of coins or bills, and scans inputs from the BET buttons 74 to 78 and the START button 79.

After the START button 79 is pressed by the player, the main CPU 222 executes symbol determination process (step S414). In this process, the main CPU 222 generates five random numbers and determines five symbol codes of five to-be-stopped symbols corresponding to the random numbers with reference to the symbol code determination table 340. The main CPU 222 determines whether or not any winning combination is achieved by the rearranged symbol matrix that is formed of the rearranged symbols.

At step S416, the main CPU 222 executes symbol display control process. In this process, the main CPU 222 controls the reel assembly 50 to rotate the reels 52A to 52E, and then to stop rotating the reels 52A to 52E in order to rearrange the symbols in accordance with the symbol determination result to form the symbol matrix in the display window 56.

Then, at step S418, the main CPU 222 determines the payout amount, and executes the payout process to provide the player with the determined payout amount.

Figure 17:
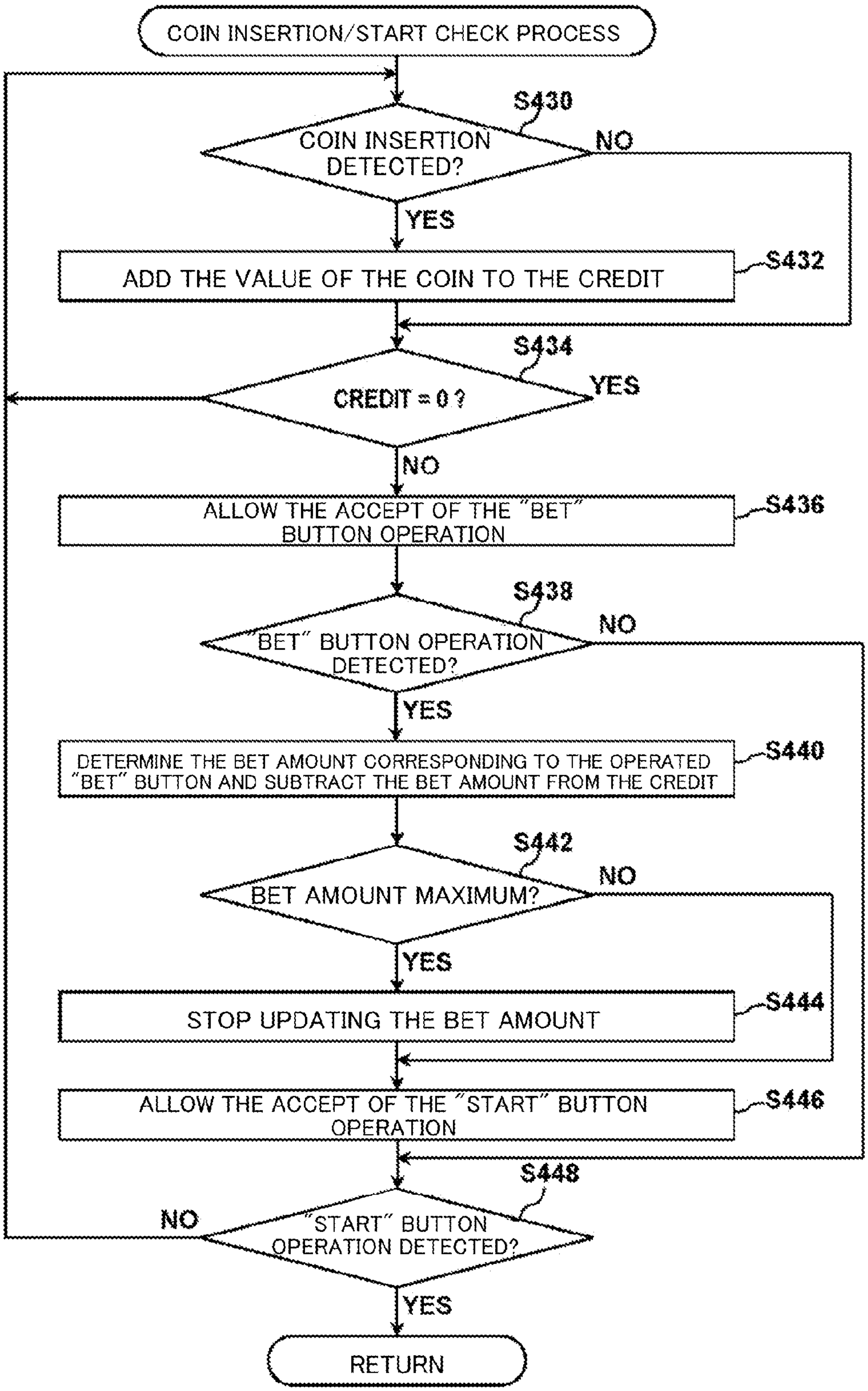
FIG. 17 is a flowchart showing the coin insertion/start check process shown in FIG. 16 in detail.

FIG. 17 shows the coin-insertion/start-check process, which shows the process at step S412 shown in FIG. 16 in detail.

First, the main CPU 222 determines, by means of the input/credit checking process part 300 executed in the main CPU 222, whether or not the coin counter 232 detects insertion of a coin (step S430). When determining at step S430 that a coin has been inserted, the main CPU 222 adds the value of the inserted coin to the credits stored in the RAM 226 (step S432). At this stage, the main CPU 222 may further determine whether or not the bill validator 246 detects insertion of a bill. When determining that a bill has been inserted, the main CPU 222 adds the value of the inserted bill to the credits.

When the process at step S432 has been completed or when it is determined at step S430 that no coin has been inserted, the main CPU 222 determines whether or not the credit amount is zero (step S434). If determining in the determination process at step S434 that there remains some credits, the main CPU 222 allows the bet setting inputs through the BET buttons 34 to 38 up to the remaining credits (step S436). If determining in the determination process at step S434 that there remains no credit, the main CPU 222 returns the process to step S430.

Afterwards, main CPU 222 monitors the bet setting input through the BET buttons 74 to 78 based on bet setting input signals output from the bet switches 74S to 78S (step S438). If the main CPU 222 determines that any of the BET buttons 74 to 78 has been pressed by the user, the main CPU 222 adjusts the betting amount value stored in the RAM 226 according to the pressed BET button, and subtracts the betting amount from the credit value stored in the RAM 226 (step S440). If determining in the determination process at step S434 that there is no BET button input for a predetermined time, the main CPU 222 proceeds the process to step S448.

During the increase of the betting amount, the main CPU 222 determines whether or not the betting amount reaches a predetermined maximum value (step S442). When the betting amount has reached the predetermined maximum value, the main CPU 222 prohibits any further increase of the betting amount (step S444).

Upon completing the process at step S444 or determining that betting amount has not reached the maximum value in the process at step S442 and the betting amount is adjusted, the main CPU 222 allows the operation input through the START button 79 (step S446). At this stage, the main CPU 222 can display the set pay lines the symbol display unit.

In the process at step S448, the main CPU 222 determines whether or not the input through the START button 79 is detected (step S448). When the input from the START button 79 has not been detected for a predetermined standby time, the main CPU 222 returns the process to step S430. If determining in the process at step S448 that the input from the START button 79 has been detected, the main CPU 222 terminates the coin-insertion/start-check process.

<<Symbol Determination Process>>

Figure 18:
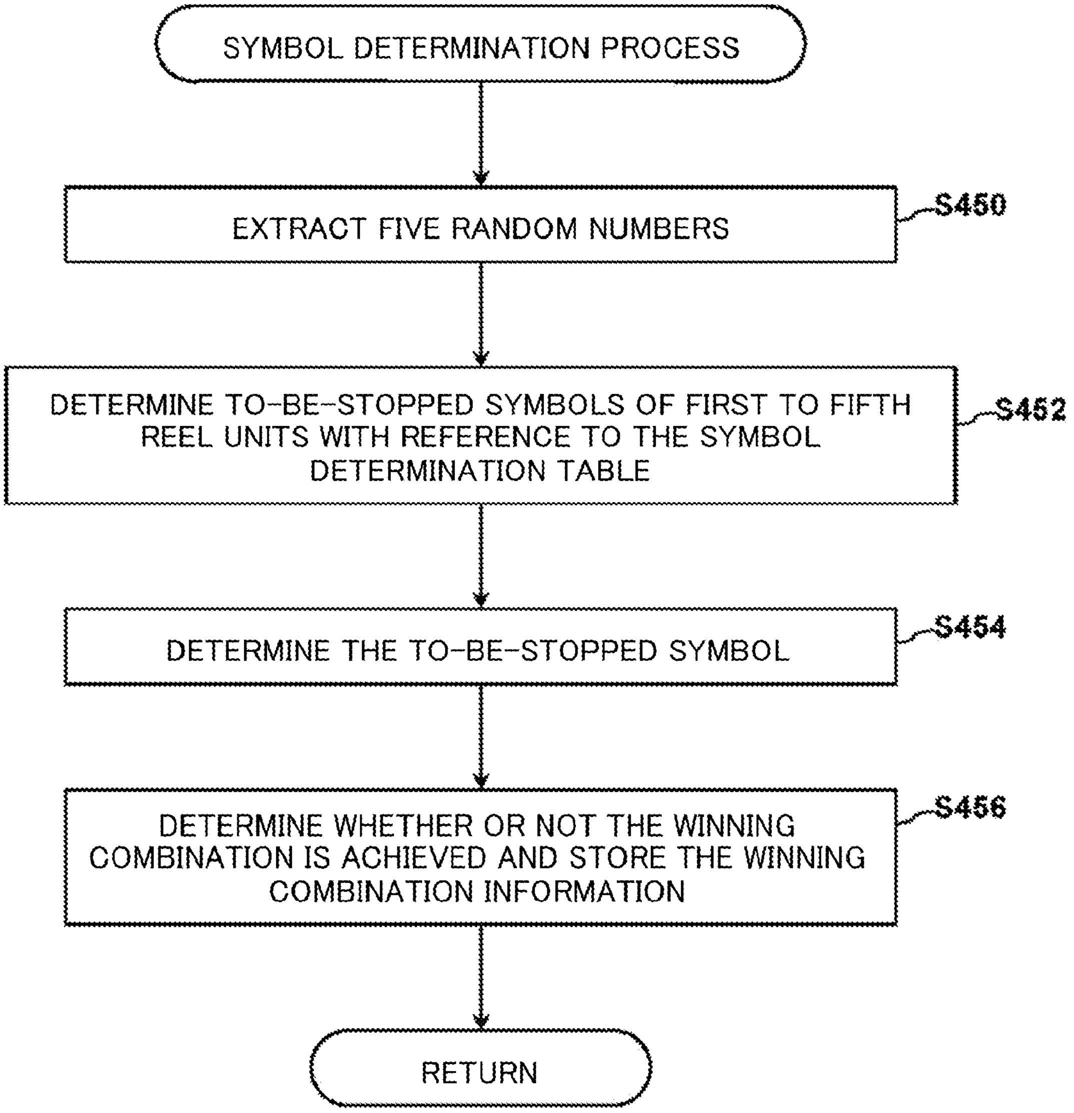
FIG. 18 is a flowchart showing the symbol determination process shown in FIG. 16 in detail.

FIG. 18 shows the symbol determination process, which shows step S414 shown in FIG. 16 in detail.

First, the random number generation process part 302 executed by the main CPU 222 extracts five random numbers (step S450).

Subsequently, the symbol determination process part 304 executed by the main CPU 222 determines first to fifth symbol codes using the first to fifth random numbers, respectively, with reference to the symbol code determination table 340 (step S452). Then, the main CPU 222 determines first to fifth to-be-stopped symbols corresponding to the first to the fifth symbol codes, respectively, with reference to the symbol code table, as shown in FIG. 6 (step S454). As a result, the five to-be-stopped symbols are determined by use of the five random numbers. Upon determination of the first to fifth to-be-stopped symbols, the main CPU 222 stores the symbols or symbol codes in the RAM 226.

The five to-be-stopped symbols are symbols to be stopped at the second row of each column of the symbol matrix shown in FIG. 8. Since the symbol alignments constituting the first to fifth symbol columns are fixed corresponding to each of the reels 52A to 52E, determining the to-be-stopped symbols determines all the symbols constituting the symbol matrix. The main CPU 222 determines all the symbols constituting the symbol matrix based on the to-be-stopped symbols with reference to the symbol code table of FIG. 6 (step S456).

Afterwards, the winning determination process part 310 executed by the main CPU 222 determines whether or not any winning combination is achieved by the symbols constituting the symbol matrix determined in the process at step S456 (step S456). In case that a winning combination is achieved by the symbols constituting the symbol matrix, the winning determination process part 310 stores the winning combination in the RAM 226 (step S456). In addition, the main CPU 222 may determine whether or not the winning combination is achieved from the symbol codes of to-be-stopped symbols without determining whether or not the winning combination is achieved using the symbol matrix.

Finally, the symbol determination process terminates and the execution flow returns to the main process (not shown).

<<Symbol Display Control Process>>

Figure 19:
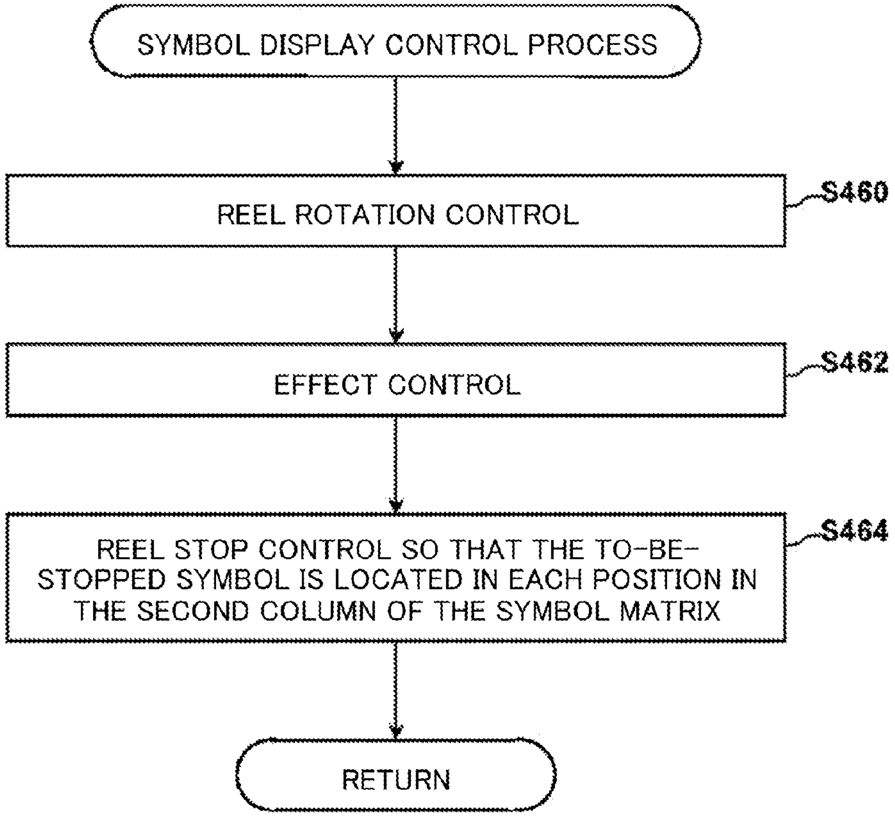
FIG. 19 is a flowchart showing the symbol display control shown in FIG. 16 in detail.

FIG. 19 shows the symbol display control process, which shows step S416 shown in FIG. 16 in detail.

First, the reel control process part 308 executed by the main CPU 222 transmits a spin control signal to the reel assembly 50 so that the reel driver 264 of the first to fifth reels 52A to 52E supplies power to the reel motor 272 to spin the reels. Each of the first to fifth reels 52A to 52E rotates at the speed different from one another, and the symbol alignment provided on the reels 52A to 52E scrolls in the display window 56 of the symbol display unit 40 (step S460).

While the first to fifth reels 52A to 52E rotates, the backlight driver 266 supplies power to the light sources 282 of the backlight device 280 and the effect illumination driver 268 supplies power to the light source 292 of the effect light illumination device 290 to execute the effect from behind the reel surfaces.

The spin control signal contains information of stop positions of the reels 52A to 52E. The reel driver 264 of the reels 52A to 52E controls the reel motors 272 to stop the reels 52A to 52E at the position indicated by the spin control signal. Thus, the reel motors 272 composed of stepping motors is stopped at desired positions, and the scroll of the symbol columns is stopped so that the to-be-stopped symbols are arranged in the second row of the symbol matrix formed in the display window 56 (step S464).

Finally, the symbol display control process terminates and the execution flow returns to the main function.

<<Payout Process>>

Figure 20:
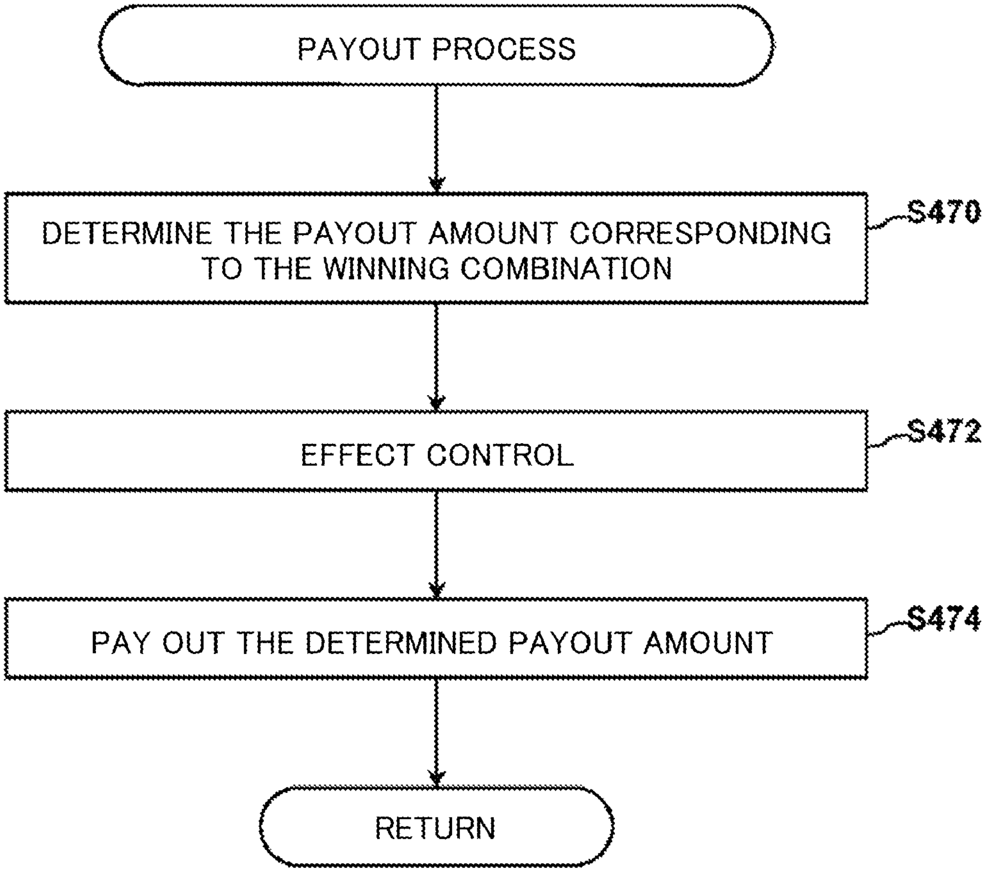
FIG. 20 is a flowchart showing the payout process shown in FIG. 16 in detail.

FIG. 20 illustrates the payout process, which shows step S418 shown in FIG. 16 in detail.

When a winning combination is achieved, the winning determination process part 310 or the payout process part 314 executed by the main CPU 222 determines the payout amount corresponding to the winning combination and stores the amount in the RAM 226 (step S470).

As soon as the reels 52A to 52E stop, the effect control process part 312 executed by the main CPU 222 controls the symbol display unit 40 and the other devices, such as the speaker 112, the lamp 114 and the video display unit 110, to execute the effects (step S472). The production effect includes video, audio effect, backlight change, and illumination effect.

Afterwards, the payout process part 314 pays out the determined amount by increasing the credits or discharging coins to the coin tray 92 (step S474).

Figure 21:
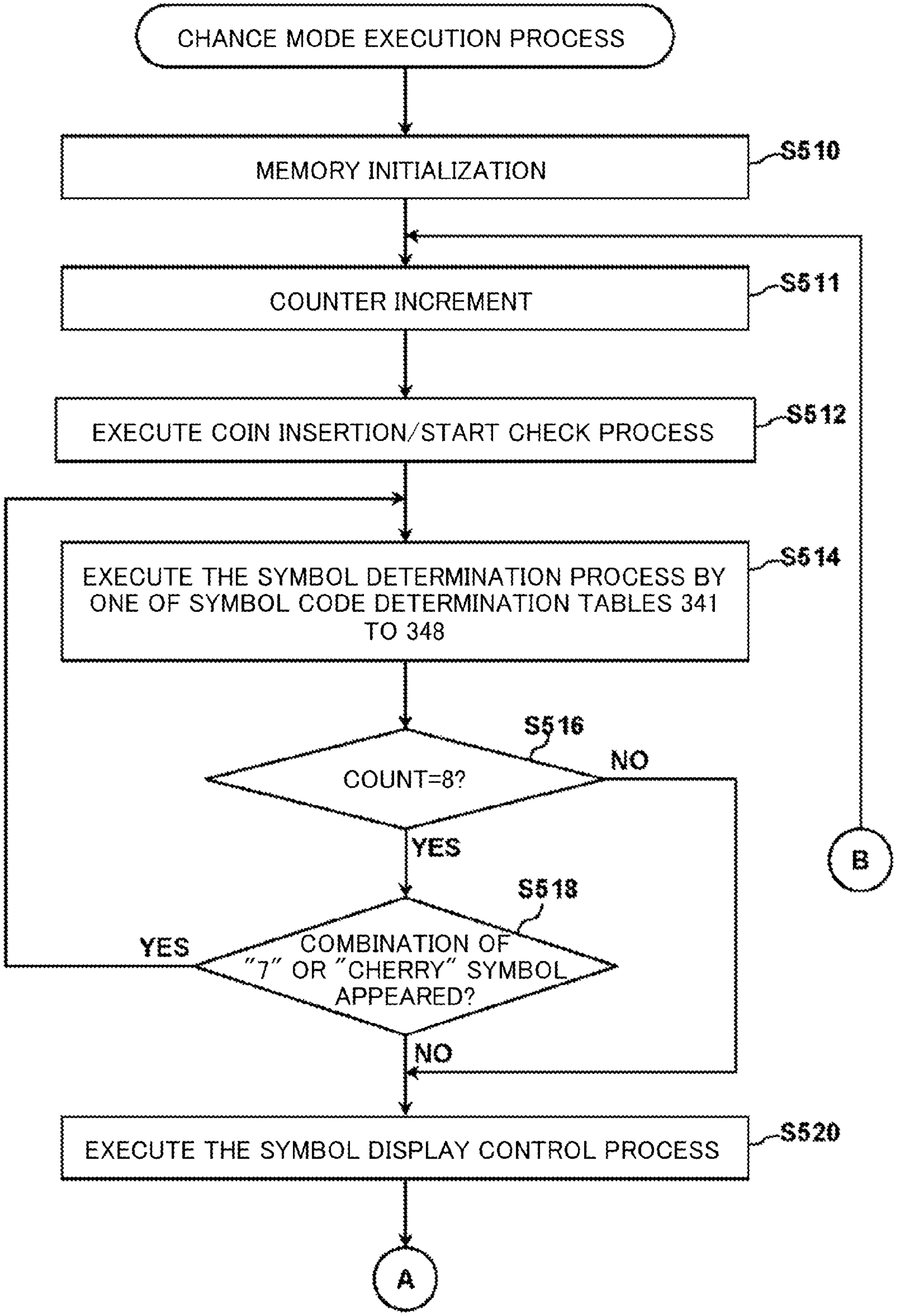
FIG. 21 is a flowchart showing the chance mode gaming process.
Figure 22:
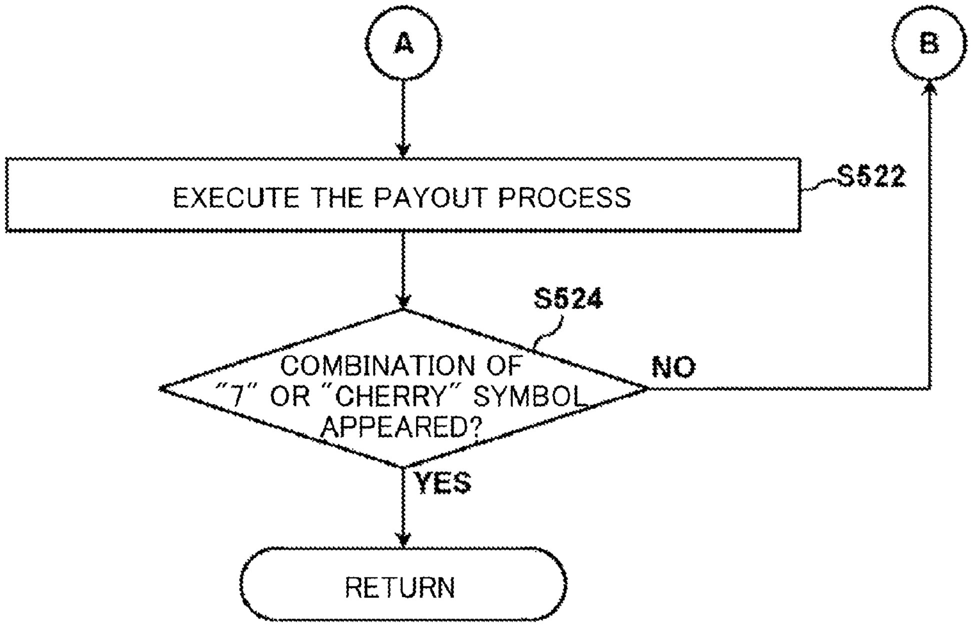
FIG. 22 is a flowchart showing the chance mode gaming process.

FIGS. 21 and 22 show the chance mode game process (step S408) along with the end condition determination process (step S409), as shown in FIG. 15 in detail.

Whenever proceeding to the chance mode, the main CPU 222 executes the memory initialization process (step S510). The main CPU 222 clears unnecessary data and information from the temporary working space of the RAM 226. The unnecessary data and information are, for example, the payout data, awarding or failure information, and the to-be-stopped symbol information determined in the previous game.

Then, at step S511, the main CPU 222 increments the count value of the counter which indicates the serial number of the chance mode game to be performed. Since the count value of the game counter is initialized to be zero, the count value of the game counter is set to 1 in the initial (first) chance mode game.

Subsequently, the main CPU 222 executes coin-insertion/start-check process (step S512). In this process, the main CPU 222 checks the insertion of coins or bills, and detects an input signal from the BET buttons 74 to 78 and the START button 79.

After the START button 79 is pressed by the player, the main CPU 222 executes symbol determination process (step S514). In this process, the main CPU 222 initially generates five random numbers. Then, the symbol determination process part 304 executed by the main CPU 222 determines first to fifth symbol codes using the first to fifth random numbers, respectively, with reference to any of the symbol code determination tables 341 to 348. When the initial (first) chance mode game is being performed, the symbol code determination table 341 is used for determining the symbol codes. When the second chance mode game is being performed, the symbol code determination table 342 is used for determining the symbol codes. Similarly, when the other chance mode games is being performed, one of the symbol code determination tables 343 to 348 is used for determining the symbol codes in accordance with the sequence order.

Afterwards, the main CPU 222 determines first to fifth to-be-stopped symbols corresponding to the first to the fifth symbol codes, respectively, with reference to the symbol code table shown in FIG. 6. As a result, five to-be-stopped symbols are determined by use of the five random numbers. Upon determination of the first to fifth to-be-stopped symbols, the main CPU 222 stores the symbols or symbol codes in the RAM 226.

Then, the winning determination process part 310 executed by the main CPU 222 determines whether or not a predetermined winning combination is achieved by the rearranged symbols. In case that a predetermined winning combination is achieved by the rearranged symbols, the winning determination process part 310 stores the winning combination in the RAM 226.

The main CPU 222 checks whether or not the value of the game count 324 reached eight (step S516). This value of the game count 324 is the number indicating that the last (eighth) chance mode game is being performed. If determining that the game count value has reached eight, the main CPU 222 determines whether or not the end condition is satisfied (step S518). One of the end conditions is that one of the winning combinations composed of the “7” symbol is achieved. Another end condition is that the “CHERRY” symbol that is the symbol matrix formed of the rearranged symbols appears in the one of the pay lines.

In case that the value of the game count 324 has reached eight, and that one of the winning combinations composed of the “7” symbol has not been achieved or the “CHERRY” symbol of the symbol matrix formed of the rearranged symbols has appeared in the one of the pay lines, the main CPU 222 returns the process to step S514 to execute the process at step S514 again. Thus, the process at step S518 enables one of the winning combinations composed of the “7” symbol to be achieved and the “CHERRY” symbol of the symbol matrix formed of the rearranged symbols to appear in the one of the pay lines.

Meanwhile, if determining that the value of the game count 324 has not reached eight in the process at step S516, and that one of the winning combinations composed of the “7” symbol has been achieved or the “CHERRY” symbol of the symbol matrix formed of the rearranged symbols has appeared in the one of the pay lines in the process at step S518, the process proceeds to step S520.

The main CPU 222 executes symbol display control process so as to control the reel assembly 50 to stop the spinning of the reels 52A to 52E (step S520). The symbol scrolling is stopped in accordance with the result of the symbol determination process, and the symbols are rearranged to form the symbol matrix in the display window 56. The main CPU 222 executes payout process to determine the payout amount and provide the player with the determined payout amount (step S522).

The main CPU 222 determines again whether or not the end condition is satisfied (step S524). If the end condition is satisfied, the main CPU 222 terminates the chance mode playing process. If it is determined in the process at step S524 that the end condition is not satisfied, the process returns to step S511 to increment the value of the game count 324 to maintain the chance mode, and then execute a unit game in next chance mode.

As described above, the chance mode games continue until a winning combination composed of the “7” symbol or the “CHERRY” symbol appears in at least one of the pay lines LINE1 to LINE5. Also, if the chance mode games are executed to a predetermined maximum number of times, the main CPU 222 enables the end condition to be assuredly satisfied.

In a preferred embodiment, the probability that the winning combination composed of the “7” symbol appears in the chance mode is larger than that in the normal mode. More specifically, as the chance mode continues, the probability that the winning combination composed of the “7” symbol appears gradually increases. Further, the probability reaches 100% in the eighth chance mode game. In contrast to this, the probabilities of the other winning combinations may decrease to some extent compared with those in the normal mode. Furthermore, it is preferable that all the pay lines LINE1 to LINE5 are activated regardless of the betting amount.

The effects by means of images and/or sounds can report the fact that the game mode is in the chance mode. For example, a word “CHANCE” is displayed on the video display unit 110, the display panel 58 of the symbol display unit 40, or the other display devices. The backlight can be brighter or darker than that in the normal mode. Also, the sound of the START button 79 in operation can be higher tone. The interval of the reel stopping sounds can be shortened.

<<<<Second Embodiment of Gaming Machine>>>>

In the first embodiment described above, the winning combination determination process part 310 executed by the main CPU 222 has determined the winning combination based only on the number of identical symbols in one of the active pay lines. In the second embodiment, the symbol columns appeared on the reels 52A to 52E contain symbols such as a kind of "WILD" symbol. The winning combination determination process part 310 can set up the winning combination taking the "WILD" symbol into account.

FIG. 23 shows another example of the symbol code table for use in the slot machine according to the second embodiment. The slot machine according to the second embodiment of the present invention which uses the symbol code table shown in FIG. 23 is similar in the structure and process to those of the slot machine in the first embodiment shown in FIGS. 1 to 21B, except the configuration of symbol columns, the tables stored in the RAM 226, and game programs executed by the main CPU 222 (particularly, the symbol determination process part 304, the winning determination process part 310, and the payout process part 314).

According to the present embodiment, the symbol columns of the reels 52A to 52E include seven types of symbols: "7", "BAR", "DOUBLE BAR", "TRIPLE BAR", "CHERRY", and "CHANCE CHERRY." Each symbol column is configured by eleven symbols. In each of the symbol columns, each symbol is assigned a code ranging from "00" to "10."

Three consecutive symbols in each symbol column appear in the display window 56 of the symbol display unit 40 to form a symbol matrix having three rows and five columns in the display window 56 of the symbol display unit 40. Each time the BET buttons 74 to 78 or the START button 79 is pressed, the reels 52A to 52E start rotating so that the symbols appeared in the display window 56 scrolls vertically. After a predetermined time period has elapsed since the reels 52A to 52E start rotating, the symbol columns stop simultaneously or sequentially. The stop of the symbol columns rearranges the symbols in the display window 56 so as to form the symbol matrix.

The "CHANCE CHERRY" symbol that appears only in the third symbol column works as a trigger symbol which shifts the game mode into the chance mode. In the present embodiment, the "CHANCE CHERRY" symbol has a shape similar to the standard "CHERRY" symbol, and has a ribbon or belt image and a word "CHANCE" in the lower portion thereof. The shape of the "CHANCE CHERRY" symbol is not limited to that of the "CHANCE CHERRY" symbol shown in FIG. 23. Similar to the first embodiment described above, after the "CHANCE CHERRY" symbol appears at the position in the second row and third column, the game mode shifts to the chance mode to start the chance mode games.

The "WILD" symbol is preferably disposed in the all of the symbol columns. As shown in FIG. 23, the "WILD" symbol used in the second embodiment includes an image of an approximately star-shaped figure, and a word "WILD" located beneath the figure. In the second embodiment, the "WILD" symbol has three functions: the function of achieving the winning combination by means of the "WILD" symbol itself, the function of achieving a predetermined winning combination by substituting the "WILD" symbol to the other symbols, and the function of deciding multiplying factor for a payout amount.

FIG. 24 shows an example of payout tables suitable for the second embodiment of the present invention. In the payout tables 380A to 388A, the payout table 380A is used for the normal mode game, and the payout tables 381A to 388A are used for the first to eighth chance mode games, respectively. All the payout tables 380A to 388A may be integrated into a single table as well. As shown in FIG. 24, the winning combination can be achieved by means of the "WILD" symbol itself. Specifically, five lined up "WILD" symbols appeared in a single pay line makes a "TOP AWARDING" combination, and thus the multiplying factor is 2500 times. Four lined up "WILD" symbols appeared on the left along a pay line result in the multiplying factor of 1200 times. Three lined up "WILD" symbols appeared on the left along a pay line result in the multiplying factor of 600 times.

Meanwhile, when the "WILD" symbol appears in an active pay line, the "WILD" symbol can be regarded as the other symbol advantageous to the player. In other words, in case that the substitution of the "WILD" symbol to the other symbol can achieve a winning combination or a higher payout amount, the "WILD" symbol can be used as a desired symbol necessary for the winning combination. Thus, the "WILD" symbol can act as a substitute for any other symbol.

Figure 25:
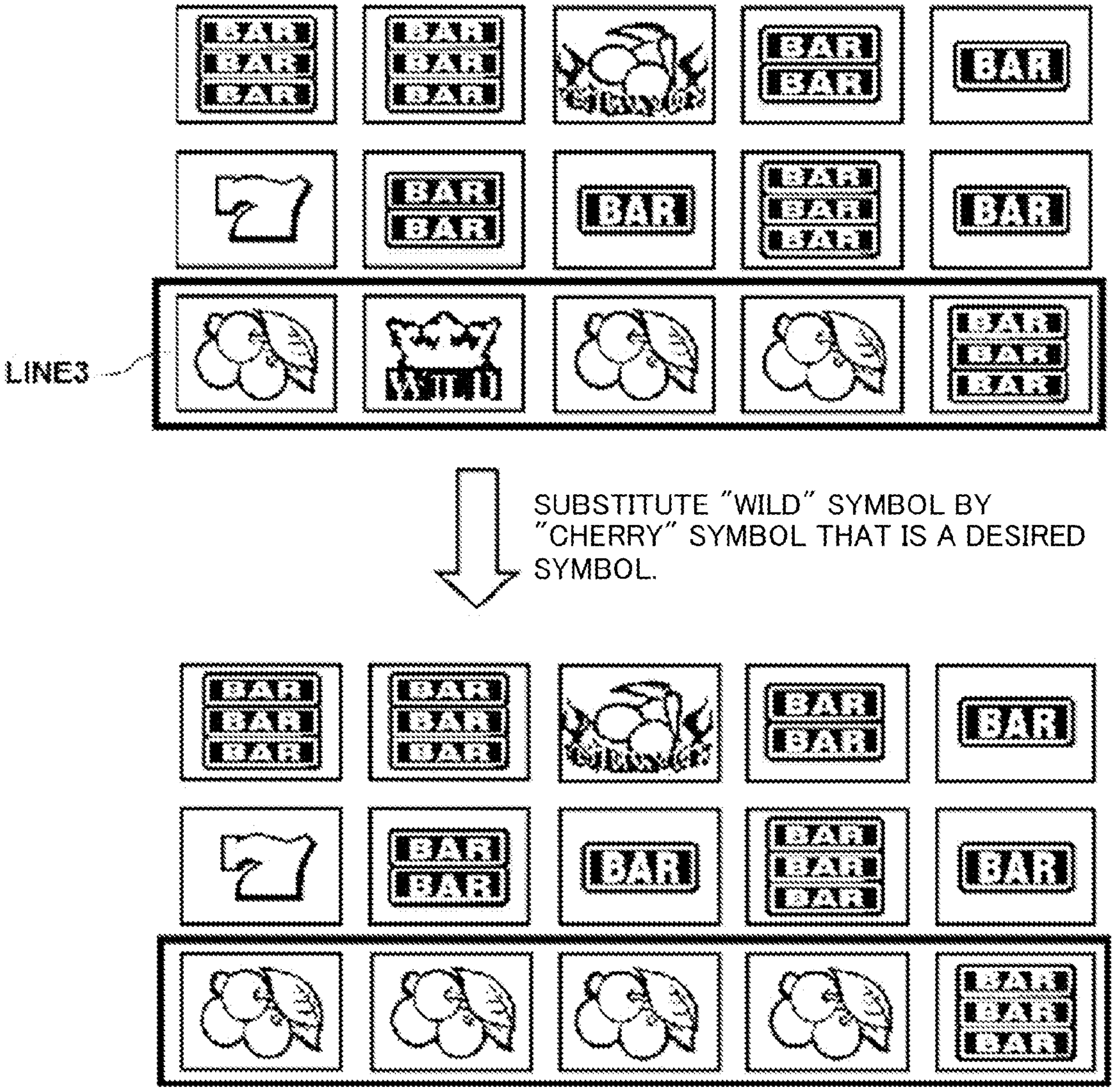
FIG. 25 is a diagram showing an example of substitution of the "WILD" symbol.

FIG. 25 shows an example of the substitution function of the "WILD" symbol. FIG. 25 is an example in which a winning combination composed of three "CHERRY" symbols is achieved in the third pay line (LINE3) and the "WILD" symbol appears in the pay line (LINE3). If the "WILD" symbol does not appear in the pay line and the "WILD" symbol cannot be substituted by the "CHERRY" symbol, the multiplying factor would be 15 times in accordance with the payout table 380A shown in FIG. 24, and the payout amount results in the amount that is 15 times of the bet amount. On the other hand, when the "WILD" symbol appears in the pay line as shown in FIG. 25, the "WILD" symbol is substituted by the "CHERRY" symbol to change the winning combination into the combination of four "CHERRY." In this case, the multiplying factor is 30 times in accordance with the payout table 380A shown in FIG. 24, and thus the payout amount results in the amount that is 30 times of the bet amount.

Furthermore, when a plurality of "WILD" symbols appears in a pay line in which a predetermined winning combination is achieved, the main CPU 222 determines a weighting factor corresponding to the number of "WILD" symbols appeared in the pay line, and then multiplies the weighting factor by the payout amount or payout rate. FIG. 26 is a table showing the relationship between the number of the "WILD" symbols and the payout amount. When one "WILD" symbol appears along the pay line in which a predetermined winning combination is achieved, the predefined payout amount is paid out with no change. When two "WILD" symbols appear along the pay line in which a predetermined winning combination is achieved, the payout amount that is double the predefined payout amount is paid out. When three "WILD" symbols appear along the pay line in which a predetermined winning combination is achieved, the payout amount that is three times the predefined payout amount is paid out. When four "WILD" symbols appear along the pay line in which a predetermined winning combination is achieved, the payout amount that is four times the predefined payout amount is paid out. If five "WILD" symbols appear along a pay line in which a predetermined winning combination is achieved, the alignment of five "WILD" symbols in the pay line configures a "TOP AWARDING" combination. Thus, 2500 times payout amount is provided to the player in this case, as shown in FIG. 24.

Figure 27:
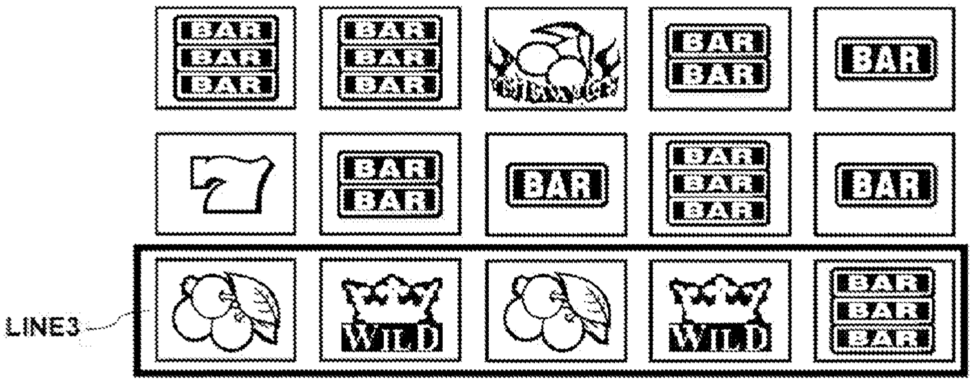
FIG. 27 is a diagram showing an example of the multiplication of the payout amount owing to the "WILD" symbol.

FIG. 27 shows an example of the multiplication of the payout amount. In the example shown in FIG. 27, a winning combination composed of two "CHERRY" symbols is achieved in the third pay line (LINE3) and two "WILD"

symbols appear in the pay line (LINE3). Two "WILD" symbols double the multiplying factor. Also, six is the predefined payout amount for the "TWO CHERRY" winning combination. Therefore, the actual payout amount given to the player is 12 by multiplying the multiplying factor two to the payout amount six.

The probabilities that winning combinations composed of a plurality of the "WILD" symbols is achieved can be changed as the chance mode games continue. FIG. 28 is the table showing the relationship between the number of unit games in a chance mode and the probabilities that winning combinations composed of a plurality of "WILD" symbols are achieved. In the example of the upper table shown in FIG. 28, the probability that the winning combination composed of a plurality of "WILD" symbols is achieved increases as the chance mode games continue. As shown in the upper table in FIG. 28, the probability that the winning combination composed of three "WILD" symbols is achieved increases as the chance mode games continue. In other words, the probability that the winning combination composed of three "WILD" symbols is achieved in the second unit game is higher than that in the second unit game. Likewise, the probability that the winning combination composed of three "WILD" symbols is achieved in the third unit game is higher than that in the second game. In such a manner, the probability that the winning combination composed of the three "WILD" symbols is achieved increases up to the last (eighth) unit game. The similar are the probability that the winning combinations composed of four "WILD" symbols and five "WILD" symbols are achieved.

As a result, the total probability that the winning combinations related with "WILD" symbol are achieved increases as the chance mode game is repetitively executed. In the example of the upper table shown in FIG. 28, the probabilities of the combinations of three "WILD" symbols, four "WILD" symbols, and five "FIVE WILD" combinations are 1/147.9, 1/3,759.5, and 1/143,093.7, respectively, in the first chance mode game. Thus, the total probability that the "WILD" symbol-related winning combinations is achieved is 1/142.2 (=1/147.9+1/3,759.5+1/143,093.7) in the first chance mode game. The total probability increases to 1/133.3 in the second chance mode game, and increase to 1/49.2 in the eighth chance mode game.

The "WILD" symbol can be used as the specific symbols along with the "CHERRY" symbol and "SEVEN" symbol. When the "WILD" symbol is used as the specific symbols along with the "CHERRY" symbol and "SEVEN" symbol, the probabilities that winning combinations including the specific symbols appear in the symbol matrix increase as the chance mode games continue. The chance mode ends when one of such winning combinations is achieved. The definition of the specific symbols and the function of the specific symbols of causing the end condition are similar to those of the first embodiment described above.

While the probability that the "WILD" symbol appears increases as the unit games continue in the example described above, the probability may not gradually increase as the games continue in the chance mode as well as in the normal mode, but may be changed to increase or decrease. FIG. 29 shows an example that the probability of the "WILD" symbol appearance decreases as the unit games continue. In the example shown in the drawing, the probability of the "WILD" symbol appearance decreases from 1/2.7 in the first chance mode game to 1/3.2 in the second chance mode game, but increases to 1/3.0 in the third chance mode game. The probability can be changed in the same manner in the normal mode also to enhance the unpredictability of the game.

The probability of the "WILD" symbol appearance may be lower in the chance mode games than in the normal mode games, as shown in FIG. 29, regardless that the "WILD" symbol is the specific symbol or not. Also, the probability of the "WILD" symbol appearance may be higher in the normal mode games than in the chance mode games.

Figure 30:
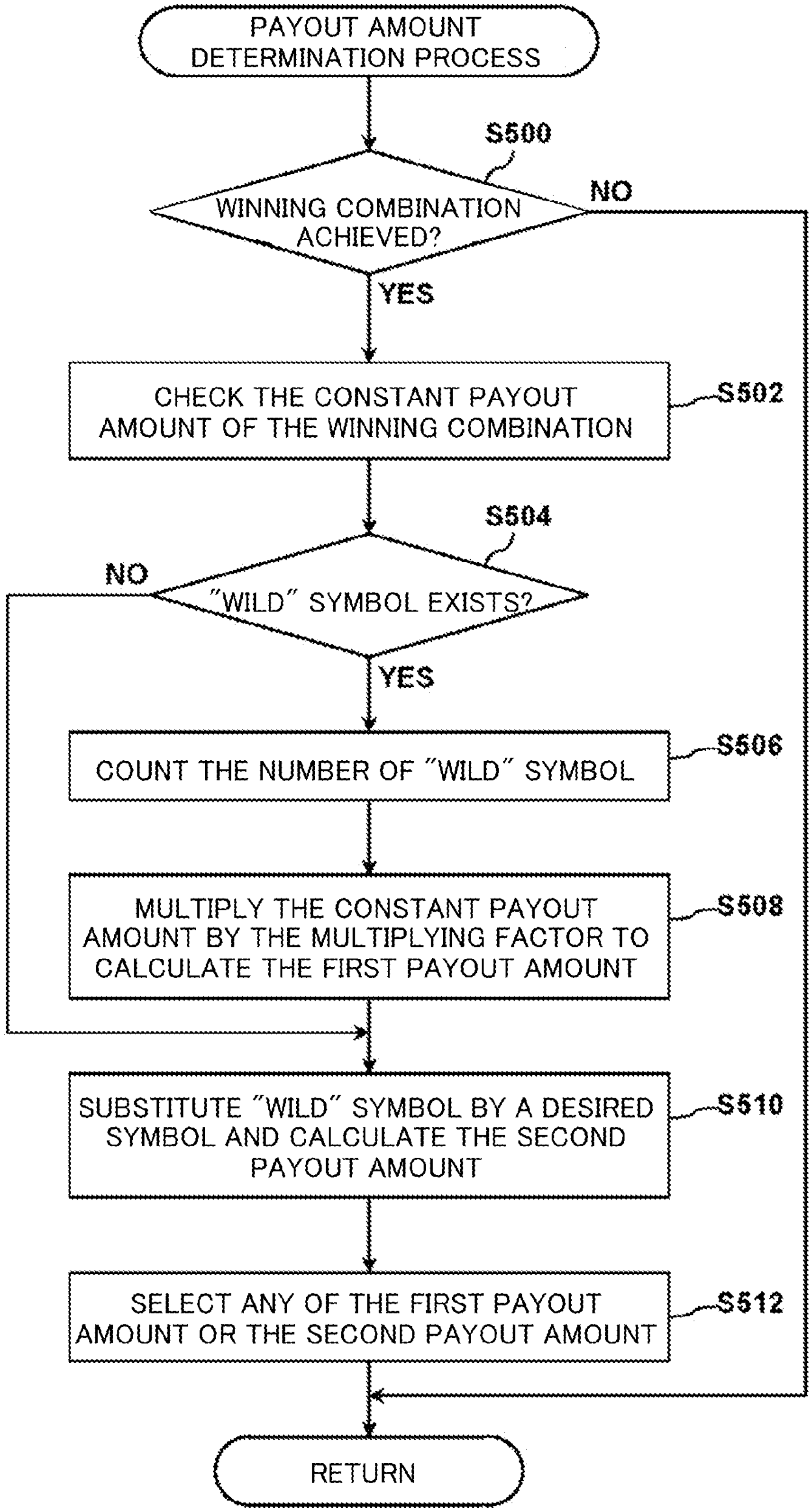
FIG. 30 is a flowchart showing a payout amount determination process according to the second embodiment of the present invention.

FIG. 30 is a payout amount determination process according to the second embodiment, which is a modified process of step S470 shown in FIG. 20.

Each time the unit game is executed, the winning determination process part 310 executed by the main CPU 222 determines whether or not a certain winning combination is achieved in the pay lines (step S500). In case that a winning combination is achieved in one of the pay lines, the winning determination process part 310 detects the winning combination and obtains the payout amount corresponding to the winning combination with reference to the payout tables 380A to 388A (step S502).

Then, the winning determination process part 310 checks whether or not a plurality of "WILD" symbols appears in the pay line in which the winning combination is achieved (step S504). If no "WILD" symbol appears or only one "WILD" symbol appears in the pay line, the procedure proceeds to step S510.

If a plurality of "WILD" symbols appears in the pay line in the process at step S504, the winning determination process part 310 counts the number of the "WILD" symbols appeared in the pay line (step S506). Afterwards, the winning determination process part 310 multiplies the payout amount obtained in the process at step S502 by the multiplication factor corresponding to the number of the "WILD" symbols appeared in the pay line to calculate a first payout amount (step S508).

The winning determination process part 310 substitutes the "WILD" symbols by desired symbols and calculates a second payout amount based on the substitution (step S510).

The winning determination process part 310 determines either the first or the second payout amounts which is larger as a final payout (step S512).

Although the examples shown in FIG. 30 show both the process of determining the multiplication factor corresponding to the number of the "WILD" symbols appeared in the pay line, and the process of substituting the "WILD" symbol appeared in the pay line by a desired symbol, only any one of the process of determining the multiplication factor and the process of substituting may be executed.

Furthermore, as shown in FIG. 23, although the second embodiment shows the example in which all of the first to fifth symbol columns include the "WILD" symbol, any symbol column among the first to fifth columns which does not include the "WILD" symbol may be provided. In such a case, although the winning combinations cannot be achieved by the alignment of two "WILD" symbols, three "WILD" symbols, four "WILD" symbols or five "WILD" symbols, it is possible to determine the multiplication factor by the appeared "WILD" symbol, and to substitute the "WILD" symbol by the other symbols.

<<<<Third Embodiment of Gaming Machine>>>>

The first and second embodiments described above have showed the examples in which the unit games start based on the BET operation executed by the player. More specifically, the BET operation by the player has been the essential condition for starting the unit games both the games in the normal mode and those in the chance mode. More specifically, the unit games start based on the fact that the player operates a "1-BET" button 74, a "2-BET" button 75, a "3-BET" button 76, a "5-BET" button 77, and a "10-BET" button 78.

The third embodiment shows an example in which the unit games can be started without executing the BET operation by the player. For example, the example of playing the game in the chance mode as a free game will be described. First, in the games in the normal mode, the unit games are started based on the execution of the BET operation by the player. In contrast, the unit games can start without executing the BET operation by the player.

The term "free game" refers to the game in which the player can get a chance to acquire game values without paying out or consuming the game values. For example, it is the game in which the unit game can be played without inserting coins and credits into the gaming machine, and the coins and credits are not consumed even if the game resultingly ends in failure. In this manner, the game in the chance mode being as the free game enables the player to get a chance to acquire the game values without consuming the game values such as coins and credits.

The slot machine according to the third embodiment has the structure and process similar to those of the slot machine according to the first embodiment shown in FIGS. 1 to 20, except for flow charts showing the processes executing games in the chance mode by the slot machine according to the first embodiment (shown in FIGS. 21 and 22). The processes in the third embodiment shown in FIGS. 31 and 32 correspond to the processes in the first embodiment shown in FIGS. 21 and 22. The description will be made by giving the same reference numerals to the components similar to those of the slot machine in the first embodiment hereinafter.

FIGS. 31 and 32 are flow charts showing the processes executing games in the chance mode executed by the gaming machine according to the third embodiment. The processes correspond to those in FIGS. 21 and 22 described above.

Upon proceeding to the chance mode, the main CPU 222 firstly executes memory initialization process (step S3111). The main CPU 222 clears unnecessary data and information from the temporary working area in the RAM 226. The unnecessary data and information includes, for example, the payout data, awarding or failure information, and the to-be-stopped symbol information determined in the previous unit game.

Then, the main CPU 222 makes the "START" button 79 ineffective (step S3113). Thus, the unit games do not start even if the player operates the "START" button 79.

Figure 33:
FIG. 33 is a diagram showing an example of a display screen displayed at the time of transition to the chance mode.

Then, the CPU 222 displays a chance mode enter report display screen on the video display unit 110 (step S3115). For example, the display screen as shown in FIG. 33 is displayed on the video display unit 110. In the example shown in FIG. 33, large "CHERRY CHANCE!!" letters and a large cherry symbol are displayed. The appearance of the "CHANCE CHERRY" symbol enables the player to recognize the entering to the chance mode.

Furthermore, as shown in FIG. 33, letters "Up to 8 FREE GAMES" are also displayed under the chance mode enter report display screen. This enables the player to recognize that the chance mode games are the free games composed of eight unit games. The unit games being executed for eight times can raise expectations of the player. Furthermore, the chance mode game being the free game makes it possible to recognize that the games can start without BET operation. Also, since the game can be played without consuming the credits, it is possible to raise expectations of the player further.

As described above, such display can give the player recognition that the game mode enters from the normal mode into the chance mode. In particular, since the symbols do not start scrolling until a predetermined period of time has elapsed even if the "START" button 79 is operated, the player can be prevented from misidentifying the gaming machine 10 as being out of order by explicitly demonstrating the chance mode enter report display screen on the video display unit 110.

Then, the main CPU 222 determines whether or not a predetermined period of time has elapsed (step S3111). Upon determining that the predetermined period of time has not elapsed (NO), the main CPU 222 returns the process to step S3117.

Upon determining that the predetermined period of time has elapsed (YES), the main CPU 222 erases the chance mode enter report display screen displayed in the process at step S3115 from the video display unit 110 (step S3119). This enables the player to visibly recognize that the games in the chance mode can be started.

Then, the main CPU 222 increments the count value of the game counter which indicates the serial number of the chance mode games to be executed (step S3121). Since the count value of the game counter is initialized to be zero by means of the process at step S3111, the count value of the game counter is set to 1 in the initial (first) chance mode game.

It is preferable that an effect image is displayed on the video display unit 110 in accordance with the count value when the count value is updated in the process at step S3121. In this way, it is possible to show the player the progress of the chance mode games, and thus to give the player feelings of expectation and tension.

Then, the main CPU 222 makes the "START" button 79 effective (step S3123). Due to the execution of the process described above, the player cannot operate the "START" button 79 until the predetermined period of time has elapsed. Therefore, the unit games do not start although the player operates the "START" button 79, the player can recognize that the game mode enters from the normal mode into the chance mode.

In particular, since the player cannot start playing the unit games although he/she overlooks the letters "CHERRY CHANCE!!" displayed on the video display unit 110, the player can recognize that the game mode enters from the normal mode into the chance mode. As described above, the player can recognize that the game mode proceeds from the normal mode to the chance mode by both the effect on the video display unit 110 and the progress of the unit games on the symbol display unit 40.

Then, the main CPU 222 determines whether or not the "START" button 79 is operated by the player (step S3125). Upon determining that the "START" button 79 is not operated by the player (NO), the main CPU 222 returns the process to step S3125.

Upon determining that the "START" button 79 is operated by the player (YES), the main CPU 222 executes the symbol determination process (step S3211). In this process, the main CPU 222 first generates five random numbers. Then, the main CPU 222 determines first to fifth symbol codes using the first to fifth random numbers with reference to any of the symbol code determination tables 341 to 348, respectively.

The first random number is the random number for determining a symbol code of a to-be-stopped symbol in the first symbol column. The second random number is the random number for determining a symbol code of a to-be-stopped symbol in the second symbol column. The third random number is the random number for determining a symbol code of a to-be-stopped symbol in the third symbol column. The fourth random number is the random number for determining a symbol code of a to-be-stopped symbol in the fourth symbol column. The fifth random number is the random number for determining a symbol code of a to-be-stopped symbol in the fifth symbol column.

When the initial (first) chance mode games are executed, the symbol code determination table 341 is used for determining the symbol code. When the second chance mode games are executed, the symbol code determination table 342 is used for determining the symbol code. Likewise, when the other chance mode games are executed, one of the symbol code determination tables 343 to 348 is used for determining the symbol code in accordance with the order.

Then, the main CPU 222 determines whether or not the value of the counter is eight (step S3213). The value of the counter indicates the number of times of the chance mode games in that session. For example, if the value of the counter is three, it indicates that the third chance mode game is executed in that session. The determination process at step S3213 is the process for determining whether or not the eighth chance mode game is executed, i.e., the last chance mode game is executed in that session.

Upon determining that the value of the counter is eight (YES) in the determination process at step S3213, the main CPU 222 determines whether or not the end condition of the chance mode is achieved (step S3215).

The end condition of the chance mode is that one of the winning combinations composed of the "7" symbols is achieved, or that the "CHERRY" symbol of the symbol matrix formed by the rearranged symbols appears in one of the pay lines, similar to the first embodiment and the second embodiment.

Upon determining in the determination process at step S3215 that the end condition of the chance mode is not achieved (NO), the main CPU 222 returns the process to step S3211. The process of step S3211 can be repetitively executed until the symbol code that satisfies the end condition of the chance mode is generated by executing the processes at steps S3211 to S3215 described above. More specifically, when the chance mode game reaches the eighth (last) unit game, the symbol code that satisfies the end condition of the chance mode can be certainly generated, and it is possible to end the chance mode for certain so as to return to the normal mode.

Upon determining in the determination process at step S3213 that the value of the counter is not eight (NO), or determining in the determination process at step S3215 that the end condition of the chance mode is achieved (YES), the main CPU 222 executes the process of rearranging the symbols (step S3217).

The process of rearranging the symbols at step S3217 causes the scroll of the first to fifth symbol columns to be started, and then stops the scroll of the first to fifth symbol columns after a predetermined period of time has elapsed. At that time, the symbol matrix of three rows and five columns is rearranged in the display window 56 so that the symbols of five symbol codes (to-be-stopped symbols) determined in the process at step S3211 appear in the second column in the display window 56 (the second column in the symbol matrix formed in the display window 56).

Then, the main CPU 222 determines whether or not a predetermined winning combination is achieved by the rearranged symbol matrix, and pays out the payout amount corresponding to the achieved winning combination when the predetermined winning combination is achieved (step S3219).

Then, the main CPU 222 determines whether or not the end condition is achieved by the rearrange symbol matrix (step S3221). Upon determining that the end condition is not achieved (NO), the main CPU 222 returns the process to step S3121. In contrast, the main CPU 222 terminates the subroutine upon determining that the end condition is achieved (YES).

Even if the unit game does not reach the eighth (last) one (the first to seven unit games), achieving the end condition by the rearranged symbol matrix terminates the chance mode games and then returns the mode to the normal mode. Therefore, the chance mode games are the games in which the first to eighth unit games at the maximum can be executed. The continuation rate in which the unit games continue in the chance mode can be the same as that in the first embodiment. For example, the probability that winning combination of three "7" symbols is achieved can gradually increases as the chance mode games continue by using the table shown in FIG. 14. More specifically, since the probability that winning combination of three "7" symbols is achieved gradually increases, the probability that the end condition of the chance mode is satisfied can be gradually increased as the chance mode games continue, thereby enabling the chance mode to be easily ended.

As described above, the probability that the winning combination is achieved is defined, and thus the unit games as the chance mode game can be played up to eight times; the chance mode can be ended before reaching the eighth game, on the other hand. The probability that the winning combination is achieved (e.g., FIG. 14) is appropriately defined, so that the number of times of the games that facilitates the termination of the chance mode games can be determined by means of the probability, thereby enabling the adjustment of the payout amount in the chance mode games to be encouraged. It is thus possible to achieve the balance between the benefit that the game hall such as a casino can obtain and the benefit given to the player.

<<<<Modification>>>>

In the process at step S3117 in FIG. 31 described above, the "START" button 79 has been inactivated (step S3113) and the chance mode enter report display screen has been displayed on the video display unit 110 (step S3115) until the predetermined period of time has elapsed. In the third embodiment, the predetermined period of time is a constant period of time for any players. However, that may be the period of time in which a player who is playing the game over a long time or a skilled player cannot play the game further and can do nothing but waiting therefor. Thus, it is favorable to change the predetermined period of time depending on the player. More specifically, if it is determined that the player is one who is playing the game over a long time or a skilled one, the predetermined period of time is shortened. This enables the chance mode games to be immediately executed, and thus the availability can be enhanced.

In order to determine whether or not the player is one who is playing the game over a long time or a skilled one, the period of time between the unit games is continuously measured. It is thus determined that the player is changed to the other one when longer time is spent between the unit games than the predetermined period of time. More specifically, since the player who is playing the game over a long time or a skilled one must be familiar with the progress of the game, the period of time between the unit games tends to be shorter. Therefore, it is possible to determine that the player is changed to the other one if longer time is spent between the unit games. Moreover, in case that the player's identification information can be acquired by means of, for example, a PTS (Player Tracking System), it is possible to determine whether or not the player is a changed one or a skilled one in accordance with the change of the identification information, the contents of the identification information, etc.

Furthermore, so-called scatter symbols are prevented from appearing in the chance mode games. The scatter symbols are the symbols that appear regardless of the pay lines upon a plurality of symbols being rearranged. The payout amount is determined in accordance with the number of the appeared scatter symbols. The payout amount of the scatter symbols is generally small because the appearance of the scatter symbols in the chance mode games may be inappropriate as the chance mode games. In addition, if the scatter symbols with large amount of payout are used, the scatter symbols may appear in the chance mode games.

Although the so-called mechanical reels 52A to 52E are used in the example described above, the structure using video reels may be employed.

What is claimed is:

1. A gaming machine configured to operate in a normal mode as well as a chance mode and to produce a game result based on a plurality of rearranged symbols obtained through execution of a game in one of said normal and said chance modes, the gaming machine comprising:

a symbol display unit;

a bet input device for accepting a betting operation from a player to output a bet information;

a video display unit for displaying an image;

a game start input device for accepting a game start operation from a player to output a start command;

a memory having a predetermined symbol determination table causing a predetermined symbol to appear on the symbol display unit during execution of a game in the normal mode with a predetermined probability, and a specific symbol determination table or tables causing a specific symbol to appear on the symbol display unit during each execution of a game in the chance mode with a specific probability; and a controller configured for executing processes of (1-1) executing a game in the normal mode based on an input of the bet information from the bet input device;

(1-2) switching operation of the gaming machine from the normal mode to the chance mode when an enter condition is satisfied as a result of referring to the predetermined symbol determination table during operation of the gaming machine in the normal mode, which switching operation process (1-2) includes the process of (1-2-1) displaying an enter image on the video display unit indicating that operation of the gaming machine switches from the normal mode to the chance mode when the enter condition is satisfied;

(1-3) executing a series of one or more free games, as chance mode games, in the chance mode; and (1-4) switching operation of the gaming machine from the chance mode back to the normal mode when an end condition is satisfied as a result of referring to the specific symbol determination table during operation of the gaming machine in the chance mode;

wherein a predetermined maximum number of free games can be executed in the chance mode before operation of the gaming machine switches from the chance mode back to the normal mode;

wherein the specific symbol determination table or tables is/are arranged such that the probability that the specific symbol will appear in a winning pattern varies from one game to the next during operation of the gaming machine in the chance mode and before operation of the gaming machine switches from the chance mode back to the normal mode;

wherein operation of the gaming machine switches from the chance mode back to the normal mode whenever the specific symbol appears in a winning pattern, regardless of the number of games that have been executed during operation of the gaming machine in the chance mode;

wherein the process (1-2) further includes the process of (1-2-2) making the game start input device ineffective after executing the process (1-2-1) and making the game start input device operative after a predetermined period of time has elapsed; and wherein the process (1-3) includes the process of (1-3-1) causing the plurality of symbols to scroll and be rearranged as the chance mode game or games based on the start command output from the input device after executing the process (1-2-2).

2. The gaming machine according to claim 1, wherein the process (1-2-2) includes the processes of (1-2-2-1) making a rotation start command from the input device ineffective after executing the process (1-2-1), and displaying the enter image on the video display unit; and (1-2-2-2) erasing the enter image from the video display unit after said predetermined period of time has elapsed, and making the rotation start command from the input device effective.

3. The gaming machine according to claim 1, wherein the process (1-3) includes the process of (1-3-2) displaying a progress image showing progress of the chance mode game or games on the video display unit as the chance mode game or games continues/continue.

4. The gaming machine according to claim 1, wherein the specific symbol determination table or tables is/are arranged such that the probability that the specific symbol will appear in a winning pattern increases from game to game during operation of the gaming machine in the chance mode and before operation of the gaming machine switches from the chance mode back to the normal mode.

5. The gaming machine according to claim 1, wherein the specific symbol determination table or tables is/are arranged such that the probability that the specific symbol will appear in a winning pattern increases monotonically from game to game during operation of the gaming machine in the chance mode and before operation of the gaming machine switches from the chance mode back to the normal mode.

6. The gaming machine according to claim 1, wherein the specific symbol determination table or tables is/are arranged such that the probability that the specific symbol will appear in a winning pattern increases sometimes and decreases sometimes, from one game to the next, during operation of the gaming machine in the chance mode and before operation of the gaming machine switches from the chance mode back to the normal mode.

7. A gaming machine configured to operate in a normal game mode as well as a chance game mode and to produce a game result based on a plurality of rearranged symbols obtained through execution of a game in one of said normal and said chance game modes, the gaming machine comprising:

a symbol display unit;

a video display unit for displaying an image;

a bet input device for accepting a betting operation from a player to output a bet information;

a game start input device for accepting a game start operation from a player to output a start command;

a memory having a predetermined symbol determination table that causes an enter symbol to appear on the symbol display unit during operation of the gaming machine in the normal mode with a predetermined probability; a first chance symbol determination table that causes an end symbol to appear on the symbol display unit during operation of the gaming machine in the chance mode with a first probability; and a second chance symbol determination table that causes the end symbol to appear on the symbol display unit during operation of the gaming machine in the chance mode with a second probability that is higher than the first probability; and a controller configured for executing processes of (6-1) starting a unit game in the normal mode, as a normal mode game, based on an input of the bet information from the bet input device in the normal mode with reference to the predetermined symbol determination table;

(6-2) determining a first plurality of symbols to be displayed on the symbol display unit with reference to the predetermined symbol determination table during operation of the gaming machine in the normal mode;

(6-3)) switching operation of the gaming machine from the normal mode to the chance mode if the plurality of symbols determined in the process (6-2) includes the enter symbol so as to satisfy an enter condition;

(6-4) displaying an enter image on the video display unit indicating that operation of the gaming machine switches from the normal mode to the chance mode when the enter condition is satisfied;

(6-5) making a rotation start command from the input device ineffective when the enter condition is satisfied;

(6-6) after executing the process (6-4), erasing the enter image from the video display unit after a predetermined period of time has elapsed;

(6-7) after executing the process (6-5), making the rotation start command from the input device effective after the predetermined period of time has elapsed;

(6-8) after executing the processes (6-6) and (6-7), determining a second plurality of symbols to be displayed on the symbol display unit with reference to the first chance symbol determination table during execution of a first unit game in the chance mode, as a chance mode game;

(6-9) if the end symbol is included in the second plurality of symbols determined in the process (6-8) so as to satisfy an end condition, executing the first unit game and then switching operation of the gaming machine from the chance mode back to the normal mode;

(6-10) if the end symbol is not included in the second plurality of symbols determined in the process (6-8) such that the end condition is not satisfied, executing a second unit game in the chance mode in which a third plurality of symbols to be displayed on the symbol display unit is determined with reference to the second chance symbol determination table in order to execute the second and subsequent unit games in the chance mode as chance mode games;

(6-11) switching operation of the gaming machine from the chance mode back to the normal mode if the end symbol is included in the third plurality of symbols determined in the process (6-10) so as to satisfy the end condition;

(6-12) determining whether or not the second and subsequent unit games are executed as chance games a predetermined number of times without the end symbol being included in the plurality of symbols determined in the process (6-10) such that the end condition is not satisfied;

(6-13) returning operation of the gaming machine to the process (6-10) if the number of times the second and subsequent unit games have been executed, determined in the process (6-12), does not reach the predetermined number of times; and (6-14) determining the third plurality of symbols to be displayed on the symbol display unit with reference to the second chance symbol determination table at least once, until the end condition is satisfied by virtue of the number of times the second and subsequent unit games are played as chance games reaching the predetermined number of times as a result of the determination in the process (6-12), and then displaying the third plurality of symbols, which satisfy the end condition, on the symbol display unit to return operation of the gaming machine from the chance mode to the normal mode.

8. The gaming machine according to claim 7, wherein the second probability changes with the second and subsequent executions of unit games as chance games during operation of the gaming machine in the chance mode.

9. The gaming machine according to claim 8, comprising the process of displaying an image on the video display unit showing progress of the chance mode game or games as the number of times the second and subsequent unit games are executed as chance game during operation of the gaming machine in the chance mode increases.

10. A gaming machine configured to operate in a normal mode as well as a chance mode and to produce a game result based on a plurality of rearranged symbols obtained through execution of a game in one of said normal and said chance modes, the gaming machine comprising:

a symbol display unit;

a bet input device for accepting a betting operation from a player to output a bet information;

a memory having a specific symbol determination table or tables and a predetermined maximum number of consecutively executable chance mode games, the specific symbol determination table or tables being configured to cause a specific symbol to appear on the symbol display unit in a winning pattern with a specific probability during each execution of a game in the chance mode, the specific symbol determination table or tables being arranged such that the probability that the specific symbol will appear in the winning pattern increases with each successive game during operation of the gaming machine in the chance mode; and a controller configured for executing processes of (12-1) executing a game in the normal mode based on an input of the bet information from the bet input device;

(12-2) switching operation of the gaming machine from the normal mode to the chance mode and temporarily making the bet input device ineffective when an enter condition is satisfied;

(12-3) executing a series of one or more free games, as chance mode games, in the chance mode, during which chance mode games symbols are rearranged and displayed on the symbol display unit in accordance with the specific symbol determination table or tables;

(12-4) counting and storing in the memory, with each execution of a free game in said series of one or more free games, the number of free games that are consecutively executed; and (12-5) switching operation of the gaming machine from the chance mode back to the normal mode after execution of a free game that causes one of a plurality of potential end conditions to be met, said plurality of potential end conditions comprising 1) the specific symbol appearing on the display arranged in the winning pattern, and 2) the number of free games that are consecutively executed reaching the predetermined maximum number of consecutively executable chance mode games.

* * * * *